United States Patent [19]

Cloonan et al.

[11] Patent Number: 5,550,815
[45] Date of Patent: Aug. 27, 1996

[54] APPARATUS AND METHOD FOR REDUCING DATA LOSSES IN A GROWABLE PACKET SWITCH

[75] Inventors: Thomas J. Cloonan, Downers Grove; Gaylord W. Richards, Lisle, both of Ill.

[73] Assignee: Lucent Technologies Inc., Murray Hill, N.J.

[21] Appl. No.: 366,705

[22] Filed: Dec. 30, 1994

[51] Int. Cl.⁶ ................................................. H04L 12/54
[52] U.S. Cl. ..................... 370/54; 370/58.2; 370/60.1; 370/61; 370/94.2
[58] Field of Search .......................... 370/54, 58.2, 60, 370/60.1, 61, 94.1, 94.2

[56] References Cited

U.S. PATENT DOCUMENTS

| | | | |
|---|---|---|---|
| 4,035,584 | 7/1977 | Lurtz | 179/15 |
| 4,592,048 | 5/1986 | Beckner et al. | 370/60 |
| 4,872,158 | 10/1989 | Richards | 370/58.1 |
| 4,988,993 | 1/1991 | Hwang et al. | 340/825 |
| 4,993,016 | 2/1991 | Richards | 370/54 |
| 5,122,892 | 6/1992 | Cloonan et al. | 359/117 |
| 5,130,984 | 7/1992 | Cisneros | 370/94.1 |
| 5,258,978 | 11/1993 | Cloonan et al. | 370/60 |
| 5,291,482 | 3/1994 | McHarg et al. | 370/60 |
| 5,311,345 | 5/1994 | Cloonan et al. | 359/139 |
| 5,345,441 | 9/1994 | Paker et al. | 370/54 |

OTHER PUBLICATIONS

Y. S. Yeh et al., "The Knockout Switch: A Simple, Modular Architecture for High–Performance Packet Switching", *ISS '87 AT&T Technical Papers*, pp. 287–311.

W. E. Stephens et al., "Terabit-per-Second Throughput Switches for Broadband Central Offices: An Overview", *IEEE LCS*, Nov. 1990, pp. 20–26.

K. Y. Eng et al., "A Growable Packet (ATM) Switch Architecture: Design Principles and Applications", *IEEE Transactions on Communications*, vol. 40 No. 2, Feb. 1992, pp. 423–430.

Primary Examiner—Douglas W. Olms
Assistant Examiner—Russell W. Blum
Attorney, Agent, or Firm—Jack R. Penrod

[57] ABSTRACT

A new dimension for growth is presented for the generalized growable packet switch architecture. That dimension is time and by rolling routing requests around a distributed out-of-band controller ring, ATM cell traffic can be controlled and spread across two time intervals. The rolling of routing requests and the resulting time spreading of the cell traffic through the distribution network averages out bursts and localized hot spots, thereby reducing blocking and improving cell loss probabilities with only small increases in hardware cost and complexity.

6 Claims, 24 Drawing Sheets

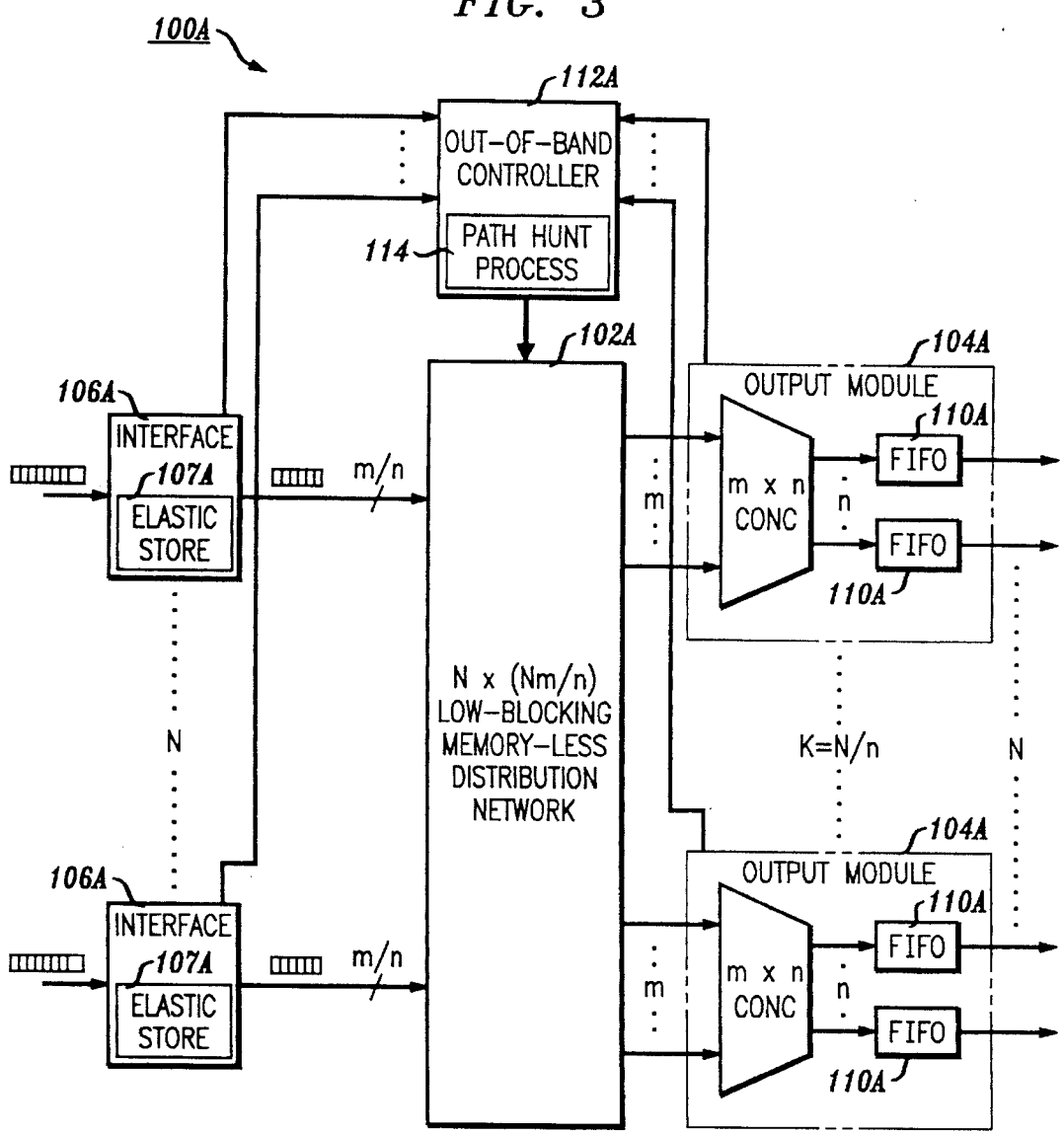

FIG. 18

| TIME | MEMORY #0 | MEMORY #1 | MEMORY #2 | MEMORY #3 |
|------|-----------|-----------|-----------|-----------|
| i,0  | GROUP 0   | GROUP 1   | GROUP 2   | GROUP 3   |
| i,1  | GROUP 3   | GROUP 0   | GROUP 1   | GROUP 2   |
| i,2  | GROUP 2   | GROUP 3   | GROUP 0   | GROUP 1   |
| i,3  | GROUP 1   | GROUP 2   | GROUP 3   | GROUP 0   |

FIG. 21

| TIME | MEMORY #0 | MEMORY #1 | MEMORY #2 | MEMORY #3 |
|---|---|---|---|---|
| i,0 | GROUP 1, PERIOD i | | | |
| i,1 | | GROUP 1, PERIOD i | | |
| i,2 | | GROUP 2, PERIOD i | GROUP 1, PERIOD i | |
| i,3 | | | GROUP 2, PERIOD i | GROUP 1, PERIOD i |
| i,4 | CLEAR BITS | | GROUP 3, PERIOD i | GROUP 2, PERIOD i |
| i,5 | GROUP 2, PERIOD i+1 | | | GROUP 3, PERIOD i |
| i,6 | GROUP 3, PERIOD i+1 | CLEAR BITS | | GROUP 4, PERIOD i |
| i,7 | GROUP 4, PERIOD i+1 | GROUP 3, PERIOD i+1 | | |
| i,8 | | GROUP 4, PERIOD i+1 | CLEAR BITS | |
| i,9 | | | GROUP 4, PERIOD i+1 | |

APPARATUS AND METHOD FOR REDUCING DATA LOSSES IN A GROWABLE PACKET SWITCH

CROSS REFERENCES

This application is related to the following co-pending applications:

"A Terabit Per Second Packet Switch Having Assignable Multiple Packet Loss Probabilities", Thomas Jay Cloonan and Gaylor Warner Richards, Filing date Aug. 31, 1995, and Ser. No. 08/522,209, currently pending; and "Terabit Per Second ATM Packet Switch Having Out-Of-Band Control With Mult-casting", Thomas Jay Cloonan and Gaylord Warner Richards, Filing Date Aug. 31, 1995, and Ser. No. 08/521,676, currently pending.

TECHNICAL FIELD

The present invention relates to switching systems and, more particularly, to an apparatus and method for reducing the amount of internal blocking within large, high throughput switching systems.

BACKGROUND OF THE INVENTION

Recent research efforts have produced a generalized packet switched architecture which can be extended to large sizes. The architecture is referred to in the literature as the growable packet switch architecture. This architecture also provides many valuable features besides efficient switch growth. It uses the statistical nature of packet traffic to allow meaningful tradeoffs between overall switch cost, complexity, and delay-and-throughput characteristics. The growable packet switch architecture is described in the article: A Growable Packet Switch Architecture, IEEE Transactions on Communications. February, 1992, by Eng et al. Furthermore, the growable packet switch architecture may provide contention resolution between multiple packets that are destined for the same output port using a technique very similar to that explained in the article: The Knockout Switch, ISS, AT&T Technical Papers, 1987, by Yeh et al. The growable packet switch architecture further requires correct ordering of packets at the output ports as most packet protocols require, but does not specify how that requirement is to be fulfilled. It also permits multicast and broadcast operation, but does not provide any implementation details.

The general growable packet switch architecture is shown in FIG. 1. In FIG. 1, the packet switch 100, has two basic sub-systems: the distribution network 102 and the output packet modules 104. The operation of the packet switch 100 requires that each of the packets arriving at its respective input port be synchronized at the packet level. If the packet switch 100 is for Asynchronous Transfer Mode (which shall be assumed), the packets are referred to as cells. The synchronization is provided for each cell by a respective elastic store 107 inside each interface card 106. Such synchronizations allows the operation of the packet switch 100 to be divided into successive ATM cell intervals. The distribution network 102 of a growable packet switch is memoryless, so it must route each cell that arrives at its inputs within a particular ATM cell interval to any input port on the output packet module that has a connection to the packet's desired output line. Each of the output packet modules 104 includes memory devices which are used to buffer the cells in order to alleviate problems associated with multiple cells destined for the same output line at the same time.

According to the growable packet switch architecture, the only way to reduce cell loss probabilities with fixed link rates is to grow the switch bigger. Consider the example of an N-input, N-output network, such as packet switch 100. If it is to be constructed, it may be built from K output packet modules, where each output packet module 104 has m inputs and n outputs. If the output packet modules 104 have these input-output characteristics, then the distribution network 102 of packet switch 100 must support N input ports, and (Nm/n)=(Km) output lines which are connected to the K=N/n mxn output packet modules 104. The circuitry within each output packet module 104 routes each of the arriving cells within a particular ATM cell interval to one of n FIFOs 110 within its respective output packet module 104. As a result, each of the N output ports has a FIFO 110 associated with it. Once every ATM cell interval, the output packet module 104 extracts a cell from the front of each of the queues within each of its FIFOs 110 and transmits the cell out on the output port associated with the respective FIFO 110. The length of these FIFO queues can be selected to produce any desired queue overflow probability using formulae developed from queuing theory principles.

Although the growable packet switch architecture is an extremely powerful design, if it is strictly followed the only way to reduce cell loss probabilities within the switch typically requires an increase in the hardware cost and complexity of the switch's distribution network or the output module or both.

An interesting feature of the growable packet switch is the manner in which it provides contention resolution between multiple packets that are destined for the same output port. The contention resolution problem is a problem that must be addressed by all packet networks. Typically, some form of arbitration and some form of buffering are required to solve the contention resolution problem. Arbitration is used to determine which of the many input packets will be given priority whenever contention exists. Those packets which are not able to be instantly routed to their desired output are usually buffered at some point in the network, and re-transmitted to their desired output at a later time. In the growable packet switch architecture, the knockout principle mentioned previously is used instead to decrease the number of buffers (FIFO queues) that are required. The knockout principle takes advantage of the statistical nature of packet traffic to determine the number of unique paths that must be provided to each output port to yield desired operating characteristics. As an example of the knockout principle, consider if more than m cells were simultaneously destined for the same mxn output packet module during a particular ATM cell interval. For such a case, only m of the cells can be successfully routed through the distribution network and the rest of the packets must be dropped, i.e. knocked out.

For an N-input, N-output switch 100 comprised of N/n mxn output packet modules 104 and a N×(Nm/n) distribution network 102, if R represents the average occupancy on the input links, then the cell loss probability within the distribution network 102 according to Eng et al. is given by:

$$P(\text{cell loss}) = [1/\{nR\}] \left[ \sum_{k=m+1}^{N} [k-m] [(N!)/(k! (N-k)!)][nR/N]^k [(1-nR/N)]^{\{N-k\}} \right.$$

For large values of N, this formula can be simplified to yield:

P(cell loss) =

$$[1 - m/(nR)] \left[ 1 - \sum_{k=0}^{m} (nR)^k e^{\{-nR\}}/k! \right] + (nR)^m e^{\{-nR\}}/m!$$

These formulae assume that the arriving cell traffic has independent and uniform destination address distributions, so the traffic is uniformly distributed across all of the output ports (and therefore across all of the output packet modules). These formulae also assume that the distribution network 102 is virtually non-blocking, i.e., the probability that an idle input port cannot be connected to an idle output port is much less than the cell loss probability due to the knockout principle.

Various switch designs proposed in the switching system art could be used to realize the distribution network 102 within the growable packet switch architecture shown in FIG. 1. An electronic version of a crossbar switch using discrete or integrated circuit components and multistage Benes and Clos networks are just some of many possible examples. So, to physically realize a packet switch from the growable packet switch architecture requires a lot of techological development. Thus, there is a need in the art for a growable packet switch design that has low cell loss probabilities but is not unduly complex to physically realize.

A related consideration is what type of controller 112 might be used for routing cells within the distribution network 102. Whether controller 112 might be an out-of-band type or an in-band type, which is also known as a self-routing type. The type of controller 112 that might be used has some relationship to how many stages are used.

Path hunt calculations to determine cell routing for in-band controllers are based only on localized traffic information and not on global information regarding all of the switch traffic because of time and hardware considerations for obtaining global information, so the connections selected by an in-band controller may not always be optimal. As a result, networks based on in-band controllers often require substantially more switching fabric (stages and/or nodes) in order to provide the same cell loss probabilities as a comparably sized switch system which uses an out-of-band controller. Thus, there is a need in the an for a growable packet switch that does not use an in-band controller.

The design of an ATM packet switch must provide a means for delaying (temporarily in a deterministic, fixed length FIFO) arriving cells at the packet switch inputs, extracting VPI/VCI information from the cell headers, deriving routing request information from each VPI/VCI value through a look-up table (indicating the cell's desired output port or line), and transmitting this routing request information to the controller 112. The controller 112 must rapidly hunt paths for all of the cells that are arriving at the N input ports. The controller 112 calculates and stores information regarding the current state (busy or idle) of each of the shared resources (links and nodes) within the distribution network 102. This information is commonly stored in a busy-idle table in memory of some sort, which stores one bit of information for each of the links in the network. Once the controller 112 calculates the appropriate paths for each of the cells that have arrived at the inputs, it transmits control information into the distribution network 102 to set up the required paths. The cells in the elastic stores 107 of the packet switch inputs can then be extracted and routed through the distribution network 102. Although memory devices may be used in the elastic stores 107, cells are stored there only for synchronization and path hunt purposes, not for the accommodation of contention between cells. Thus, the distribution network and its input interfaces are 'memoryless' within the meaning of that term, i.e. no long term storage to accommodate cell contention.

The growable packet switch 100 uses output queuing to avoid the occurrence of head-of-line blocking. The cells that are temporarily held in the input FIFO do not suffur from head-of-line blocking, because the FIFOs are simply acting as delay lines. The amount of time spent by any cell in an input FIFO is a fixed amount that is known before the cells arrive in the FIFO- it is not at all a function of the traffic in the packet switch 100. It is beneficial to define two new terms associated with the processing and routing of an ATM cell: the arrival interval and the routing interval. The arrival interval the an ATM cell is defined as the ATM cell interval during which the cell arrives at its input line interface card 106. The routing interval for an ATM cell is defined as the ATM cell interval during which the cell is passed from an input line interface card 106 into the distribution network 102. Since the delay incurred in the FIFO 107 of the line card is a known, fixed quantity, there is always a fixed amount of time ($\Delta T$) between the arrival interval and the routing interval for a particular ATM cell. As a result, if a cell arrives during some i-th arrival interval, then it will always be routed through the distribution network during the i-th routing interval. The i-th routing interval always occurs a fixed interval of time $\Delta T$ after the i-th arrival interval. The presence of the fixed-length FIFO 107 on the input line interface card permits each arriving ATM cell to be held in its input line interface card 106 until the out-of-band controller 112 sets up a respective path, but ALL cells are held in the FIFO for the same period of time, (except the very minor variances in timing and propagation for which the synchronization is provided).

The number of stages within the distribution network 102 can have a large effect on the complexity of the path hunting that the controller 112 must perform. For example, an s-stage multistage interconnection network requires the controller 112 to locate s+1 idle links in different link-stages to identify a single idle path, so more data must be read from and written to the busy-idle memories of the controller 112 than would be required for a single-stage network, where s=1. Additionally, complicated channel graphs, which are generated by many multi-stage interconnection networks, make partitioning of the distribution network 102 into disjoint units difficult. Partitioning is desirable because it permits path hunting to be performed in parallel for each of the partitioned units. Thus, there is a need in the art for a growable packet switch which has a single-stage partitionable distribution network 102.

FIGS. 2A, 2B and 2C illustrate that there are several types of single-stage networks that could be utilized as the distribution network 102 of the growable packet switch architecture 100. The three illustrated examples are: the crossbar shown in FIG. 2A (of which the electronic integrated circuit crossbar is an example), the splitter-combiner shown in FIG. 2B, and networks constructed from a single stage of many small switching nodes shown in FIG. 2C.

Thus far, it has been assumed that the arriving packet or cell traffic has independent and uniform destination address distributions, so the traffic is uniformly distributed across all of the output ports and all of the output packet modules. For those situations when the arriving packet or cell traffic is not independent and its address distribution is not uniform such that one of the output packet modules 104 has more traffic directed to it than it has inputs, it is desirable to find a way around the cell losses that occur, i.e., knocked out by the contending cells, without greatly increasing the size and cost of the packet switch.

It is an object of the present invention to provide an apparatus that allows a reduction of ATM cell loss probabilities with very little increase in system hardware cost, and a method for operating this apparatus.

It is another object of the present invention to provide a growable packet switch that uses a controller that has global knowledge of the status of all the nodes and connections of the distribution network and output packet module inputs.

It is another object of the present invention to provide a growable packet switch with a controller which rolls path requests that cannot be fulfilled during the present interval into a next interval.

SUMMARY OF THE INVENTION

Briefly stated, in accordance with one aspect of the invention, the aforementioned objects are achieved by providing an apparatus having a plurality of line interface cards connected to packet carrying ATM lines. Each of the line interface cards has at least one output connected to a single stage distribution network which has a number of inputs. Also connected to the line interface cards to receive packet destination data is an out-of-band controller device. Each of the plural line interface cards has an storage element to store a packet as the out-of-band controller determines a communication path to the packet's destination output packet line via one output concentrator module of numerous output concentrator modules.

In accordance with one aspect of the invention, the aforementioned problems are solved and the objects achieved by providing an apparatus having a plural line interface cards connected to packet carrying ATM lines. Each of the line interface cards has at least one output connected to a single stage distribution network which has a number of inputs. Also connected to the line interface cards to receive packet destination data is an out-of-band controller device which is divided into P partitions to exploit parallelism and reduce total path hunting time. Each of the plural line interface cards has an storage element to store a packet as the out-of-band controller determines a communication path to the packet's destination output packet line via one output concentrator module of numerous output concentrator modules. Each partition of the out-of-band controller device controls the routing of data packets through its respective partition of the single stage distribution network. Further, the out-of-band controller may route a data packet that arrived in the i th time interval during either the i th routing interval or in the next subsequent routing interval.

In accordance with another aspect of the invention, the aforementioned problems are solved and the objects achieved by providing a method for controlling paths for X ATM cells entering a growable packet switch during an i th arrival interval that are destined a common mxn output packet module with X>m. First, the method routes m of the X ATM cells during an i th routing interval. Next; the remaining X-m of the X ATM cells are rolled into the next routing interval and routed to during this next routing interval to the output packet module, as long as m is equal or less than X-m. Thus, this method takes an impossible situation without rolling and uses rolling to route the ATM cells to their destinations.

BRIEF DESCRIPTION OF THE DRAWING

FIG. 3 is a block diagram of a growable packet switch according to the present invention.

FIG. 18 is a timing diagram of an out-of-band controller according to FIG. 17 showing how the poke groups progress through the busy-idle memories.

FIG. 21 is a timing diagram of an out-of-band controller according to FIG. 20 showing how the poke groups progress through the busy-idle memories and the timing of clearing each busy-idle memory unit to provide rolling of routing requests among two time intervals.

DETAILED DESCRIPTION

Figure 1:
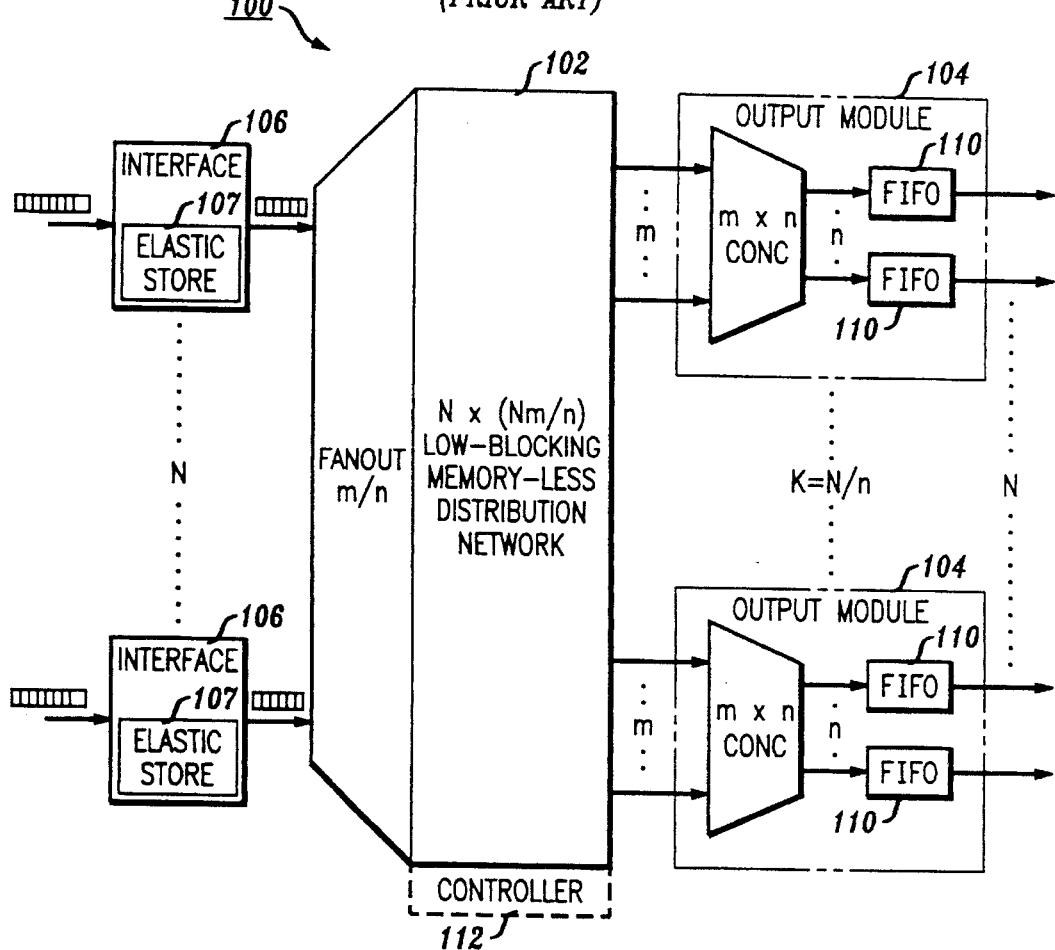
FIG. 1 is a block diagram of a generalized growable packet switch architecture.

Referring now to FIG. 3, one embodiment of a growable packet switch 100A according to the present invention is shown. Packet switch 100A has N input line interface cards 106A that are connected to N lines carrying ATM cells. The output of each input line interface card 106A is fanned-out and connected to m/n inputs of distribution network 102A, where m/n is the concentration ratio of output packet modules 104A. Input line interface cards 106A are also connected to out-of-band controller 112A.

The system design of an ATM network based on out-of-band control must provide a means of temporarily delaying (in a deterministic, fixed length FIFO) arriving cells at the network inputs, extracting VPI/VCI information from the cell headers, deriving routing request information from each VPI/VCI value through a look-up table (indicating the cell's desired output port), and transmitting this routing request information up to the out-of-band controller 112A. The controller 112A must rapidly hunt paths for all of the cells that are arriving at the N input ports during the present cell interval. This can be accomplished using a path hunt processor 114, which may be part of the controller 112A, to perform logical operations and store information regarding the current state (busy or idle) of each of the shared resources (links and nodes) within the distributed network 102A. This information is commonly stored in a busy-idle table in what is referred to as busy-idle memory 113A of some type which stores one bit of information for each of the links in the distribution network 102A (using path hunting processor 114). Once the controller 112A calculates the appropriate paths for each of the cells, it transmits control information into the distribution network 102A to set up the required paths. The cells in the elastic stores 107 at the network inputs can then be released and routed through the switch 100A.

The growable packet switch 100A uses output queuing to avoid head-of-line blocking. The cells that are temporarily held in input FIFOs 107 do not suffer from head-of-line blocking, because the FIFOs are simply acting as delay lines. The amount of time spent by any cell in an input FIFO 107 is a fixed amount that is known before the cells arrive in their FIFO 107. The amount of time any cell spent in a FIFO is not at all a function of the traffic in the switch 100A. At this point, it is useful to define two new terms associated with the processing and routing of an ATM cell: the arrival interval and the routing interval. The arrival interval for an ATM cell is defined as the ATM cell interval during which the cell arrives at the input line interface card. The routing interval for an ATM cell is defined as the ATM cell interval during which the cell is passed from the line interface card into the distribution network 102A. Since the delay incurred in each FIFO 107 of the input line interface card is a known, fixed quantity, there is always a fixed amount of time ($\Delta T$) between the arrival interval and the routing interval for a particular ATM cell. As a result, if a cell arrives during an i-th arrival interval, then it will always be routed through the distribution network 102A during the i-th routing interval. The i-th routing interval always occurs a fixed interval of time $\Delta T$ after the i-th arrival interval. The presence of the FIFO 107A on the input line interface card 106A permits each ATM cell to be held in its respective input line interface card 106A until the out-of-band controller 112A sets up the appropriate path for each cell.

Figure 2C:
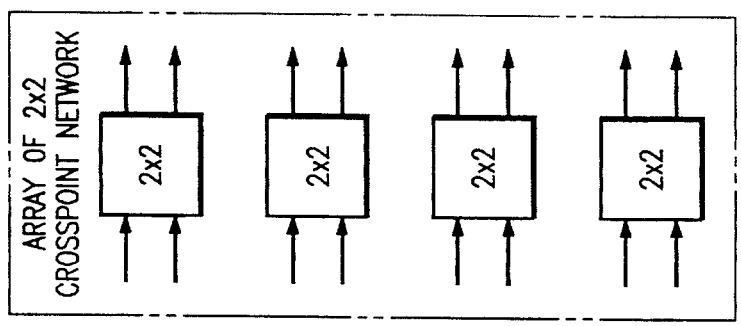
FIGS. 2A, 2B and 2C are block diagrams of three examples of single-stage networks that could be used as distribution networks.
Figure 2B:
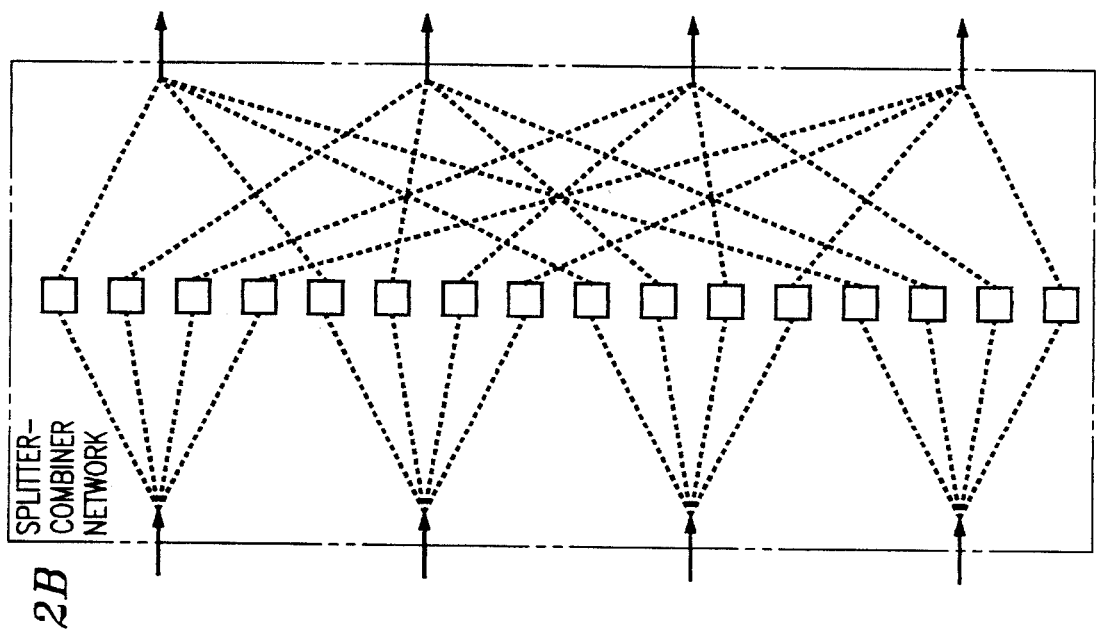
Figure 2A:
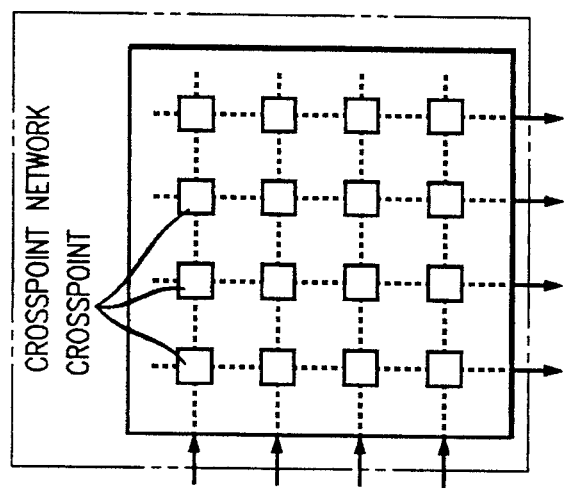

Relatively straightforward techniques can be used by the out-of-band controller 112A to actually route cells through any of the single-stage networks shown in FIGS. 2A–2C, and the techniques for each of the single-stage networks types are very similar to each other.

Figure 4:
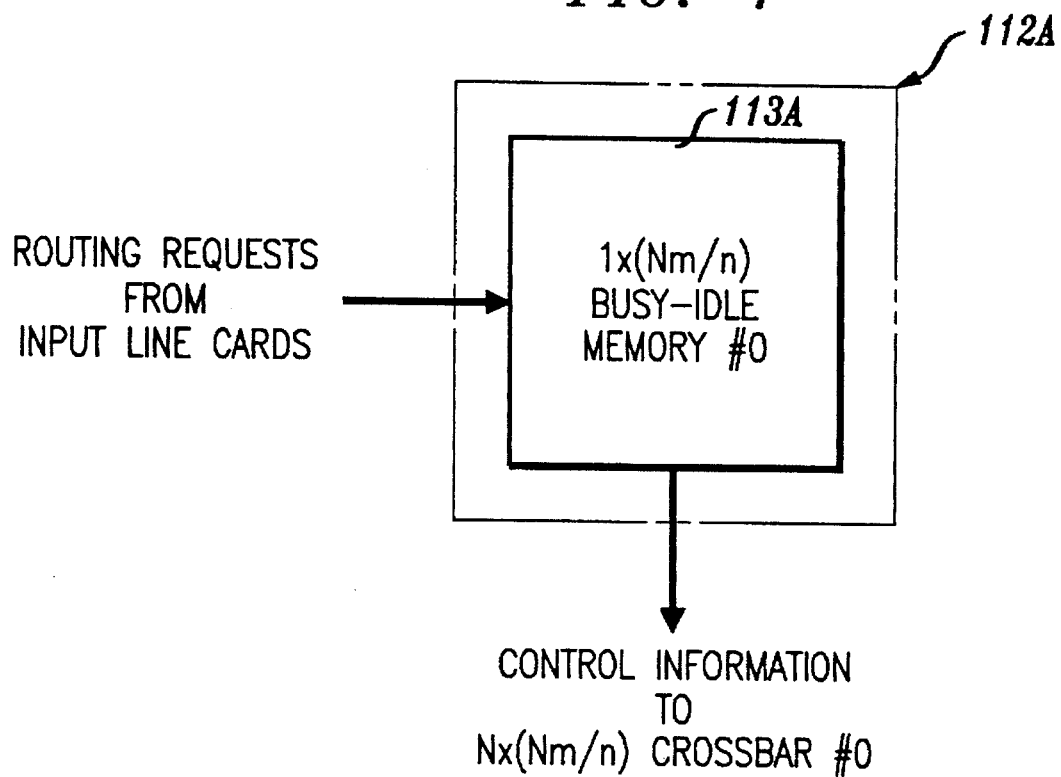
FIG. 4 is a block diagram of one embodiment of an out-of-band controller having a single busy-idle memory unit.

Consider, as an example, a distribution network 102A (which is an N×(Nm/n) crossbar). The out-of-band controller 112A for this example could be constructed with a single large busy-idle memory 113A with (Nm/n) busy-idle bits as shown in FIG. 4, with one memory bit for each of the links between the distribution network 102A and the output packet modules 104A. The controller 112A could receive up to N routing requests from the N arriving cells every ATM cell interval. As a result, the controller 112A and busy-idle memory 113A must be able to perform N path hunts within a single ATM cell interval to alleviate problems caused by queuing of routing requests. As N increases, pipelining and other parallel hardware techniques can also be used to speed up the processing within the out-of-band controller 112A and busy-idle memory 113A.

Figure 5:
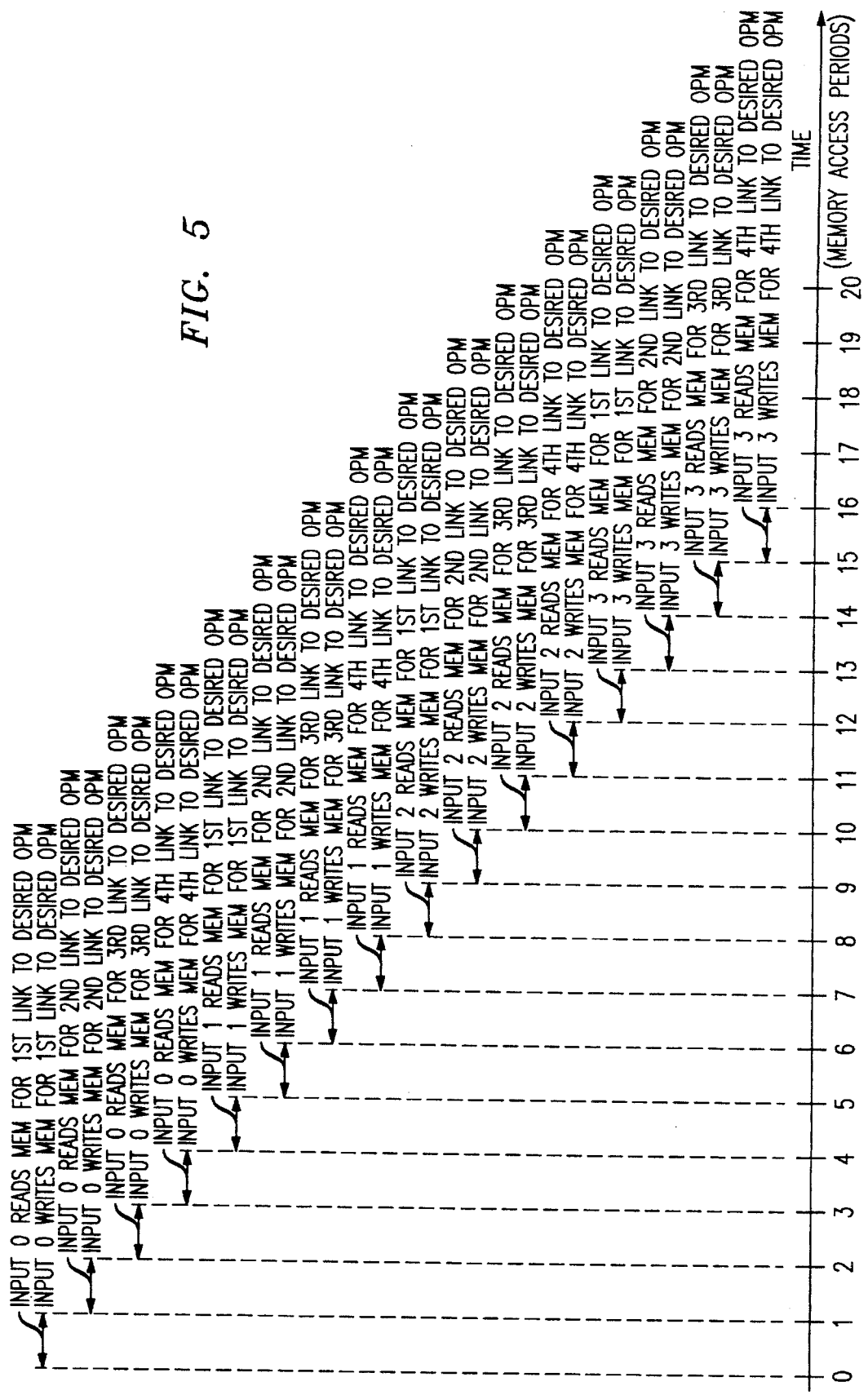
FIG. 5 is a timing diagram illustrating the operation of the busy-idle memory unit shown in FIG. 4.

In a basic embodiment of the invention, each of the N routing requests is handled separately in a sequential fashion, so N unique path hunts must be implemented in the ATM cell interval. Each path hunt requires the controller 112A and path hunting processor 114 to identify the desired output packet module 104A, and then examine each of the m busy-idle bits associated with the identified output packet module 104A until an idle bit is found. The controller 112A (using path hunting processor 114) then sets that busy-idle bit to the busy state, and sends control information to the distribution network 102A to connect the associated input with the previously idle output link. In the worst case, up to m accesses could be required for each of the N routing requests, so approximately Nm accesses into the busy-idle memory during a single ATM cell interval could be required, and the busy-idle memory 113A must be capable of sustaining an access rate of Nm accesses per ATM cell interval. For the busy-idle memory 113A, one access consists of both a read operation and a write operation. Simultaneous accesses into the busy-idle memory 113A are not permitted, because if they were permitted two consecutive busy-idle bit reads could access the same idle bit, and both requests could be routed to the same output port, an unacceptable possibility. The resulting serial timing for accesses to the busy-idle memory 113A is illustrated in FIG. 5 for a representative growable packet switch with N=4, m=4 and n=2. Scaling up of this embodiment of the invention to other values of N, m and n are straightforward from this description and FIG. 5.

Figure 6:
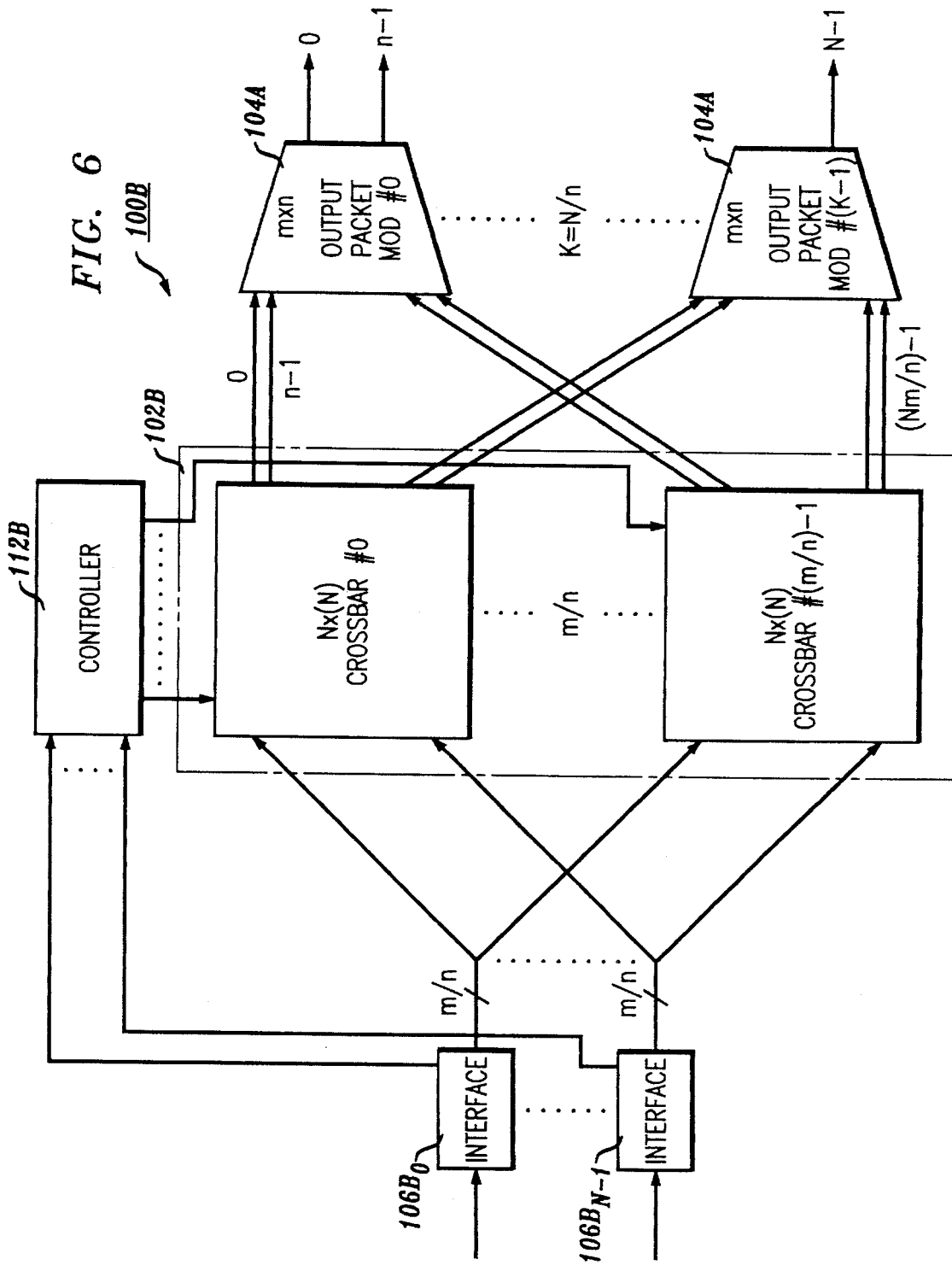
FIG. 6 is a block diagram of a packet switch according to the present invention having multiple crossbars as its switch fabric.
Figure 7:
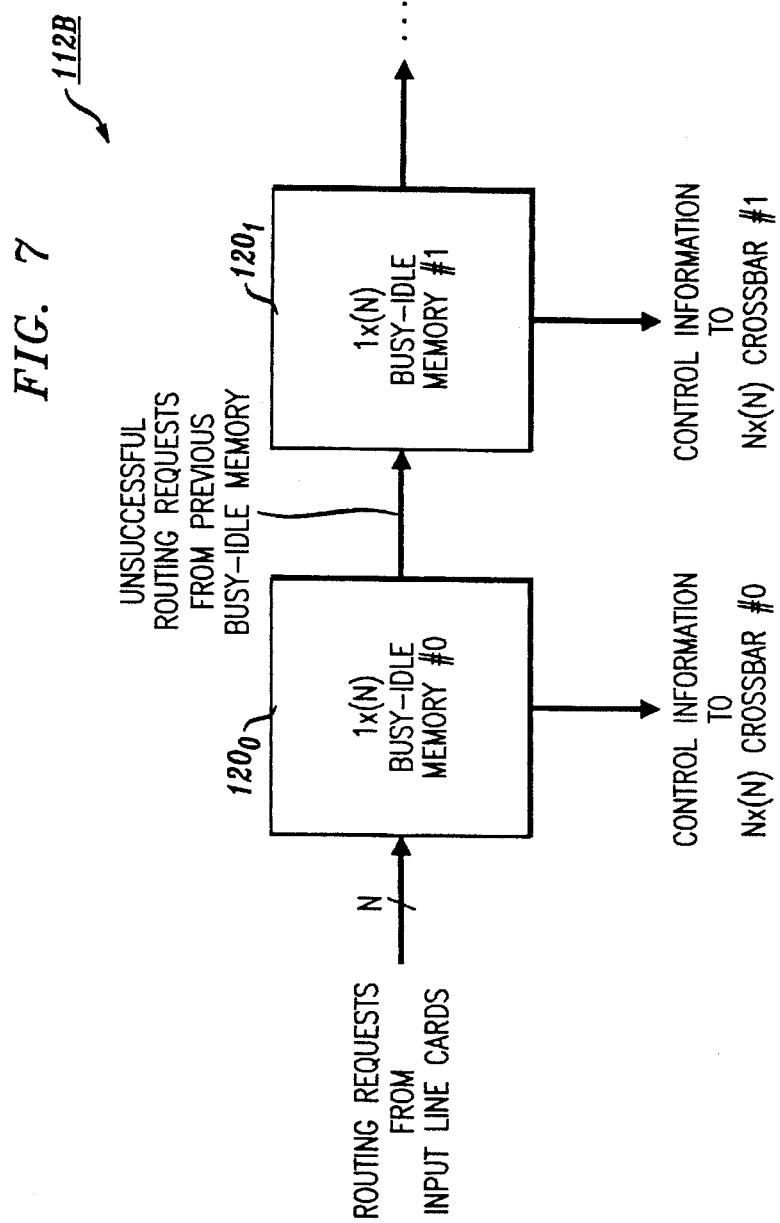
FIG. 7 is a detailed block diagram of the out-of-band controller shown in FIG. 6, which that has multiple busy-idle memory units.
Figure 8:
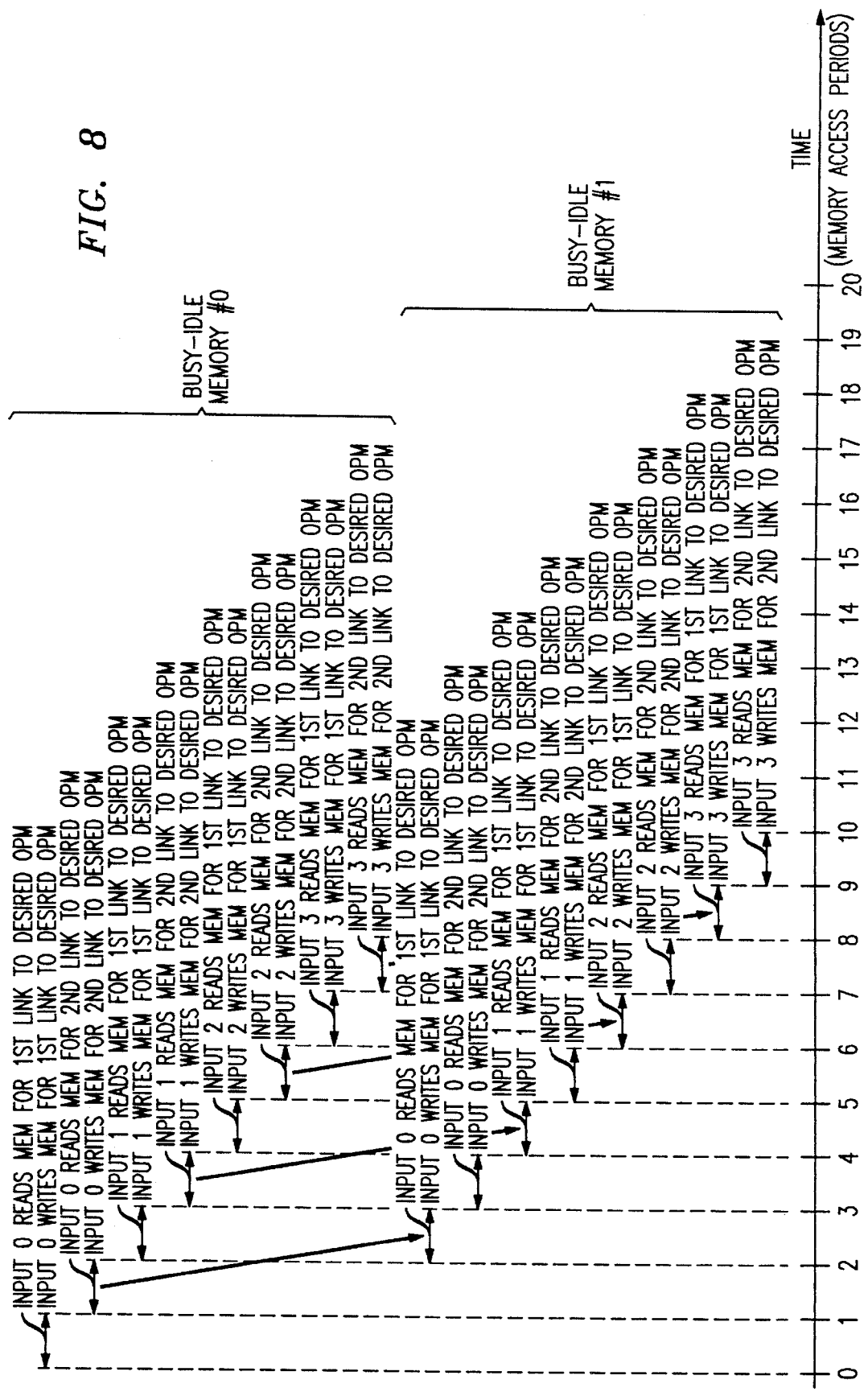
FIG. 8 is a timing diagram of an out-of-band controller according to FIG. 7, where the number of busy-idle memory units is two.

A more innovative embodiment of the present invention is shown in FIG. 6, which replaces the Nx(Nm/n) crossbar distribution network 102A with an equivalent network of m/n disjoint N×N crossbars. The resulting distribution network 102B shown in FIG. 6 provides n paths from each of the m/n N×N crossbars to each of the m×n output packet modules 104A. This embodiment requires the existence of m/n distinct links from the input line interface cards with one link directed at each of the N×(Nm/n) crossbars. It also requires the out-of-band controller 112B to treat its large busy-idle memory as m/n busy-idle memories $120_0$ to $120_{(m/n)-1}$ with N bits in each memory as shown in FIG. 7. (Note: The busy-idle memories are labeled with numbers ranging from 0 to (m/n)−1, and the N×(Nm/n) crossbar associated with each memory is indexed in the same manner). This allows the out-of-band controller 112B to pipeline the tasks, where the busy-idle memory associated with a particular N×N crossbar can be viewed as one stage of the pipeline. (Note: Busy-idle memory accesses for one N×N crossbar can be made in parallel with busy-idle memory accesses for another N×N crossbar, because they will never share a common link to the output packet module). As a result of such pipelining, each of the N path hunt operations within a single memory $120_0$–$120_{(m/n)-1}$ might be required to perform n memory accesses into the respective busy-idle memory of a particular N×N crossbar. Thus, access rate required of the busy-idle memories $120_0$–$120_{(m/n)-1}$ is reduced to (N+m/n-1)n accesses per ATM cell interval (even though the system still must provide for Nm accesses every ATM cell interval). An example of timing for accesses to busy-idle memories $120_0$–$120_{(m/n)-1}$ with m/n=2 and N=4 is indicated in FIG. 8. For the example shown in FIG. 8, all of the routing requests are poked into busy-idle memory__0 $120_0$. Each request occupies memory__0 $120_0$ until the request has tried all of the n busy-idle bits within memory__0 $120_0$ that are associated with links that connect to its desired output packet module. If this request is not successfully routed, it is sent on to the next busy-idle memory of the out-of-band controller 112B, memory__1 $120_1$, where it tries again. If the request is successfully routed, it is sent on to the next busy-idle memory anyway in order to maintain an ordinary flow of request vectors within the pipeline, but the request, since it has been successfully routed, does not activate path hunting operations within the next busy-idle memory of the out-of-band controller 112B.

Figure 9:
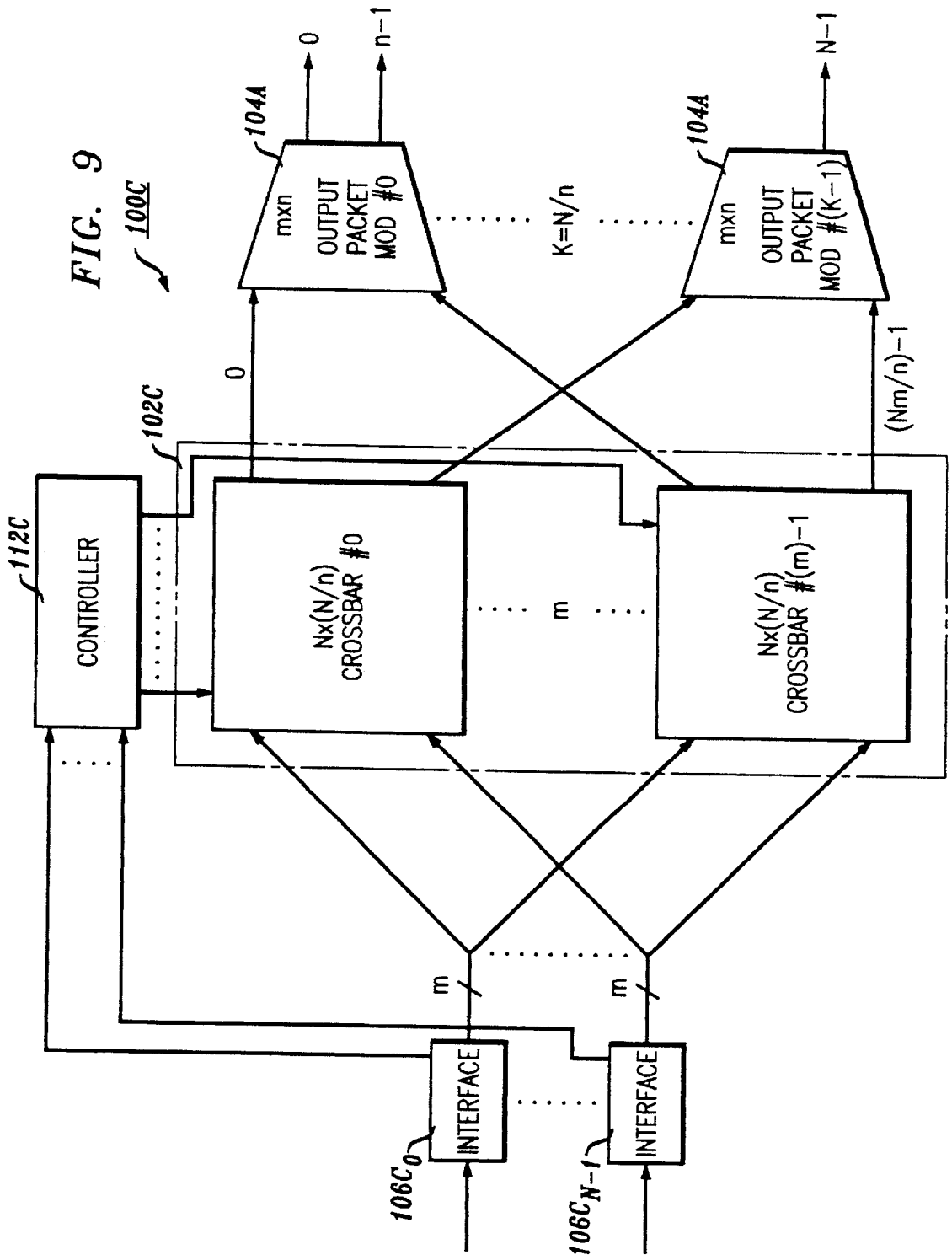
FIG. 9 is a block diagram of another embodiment of a packet switch according to the present invention.
Figure 10:
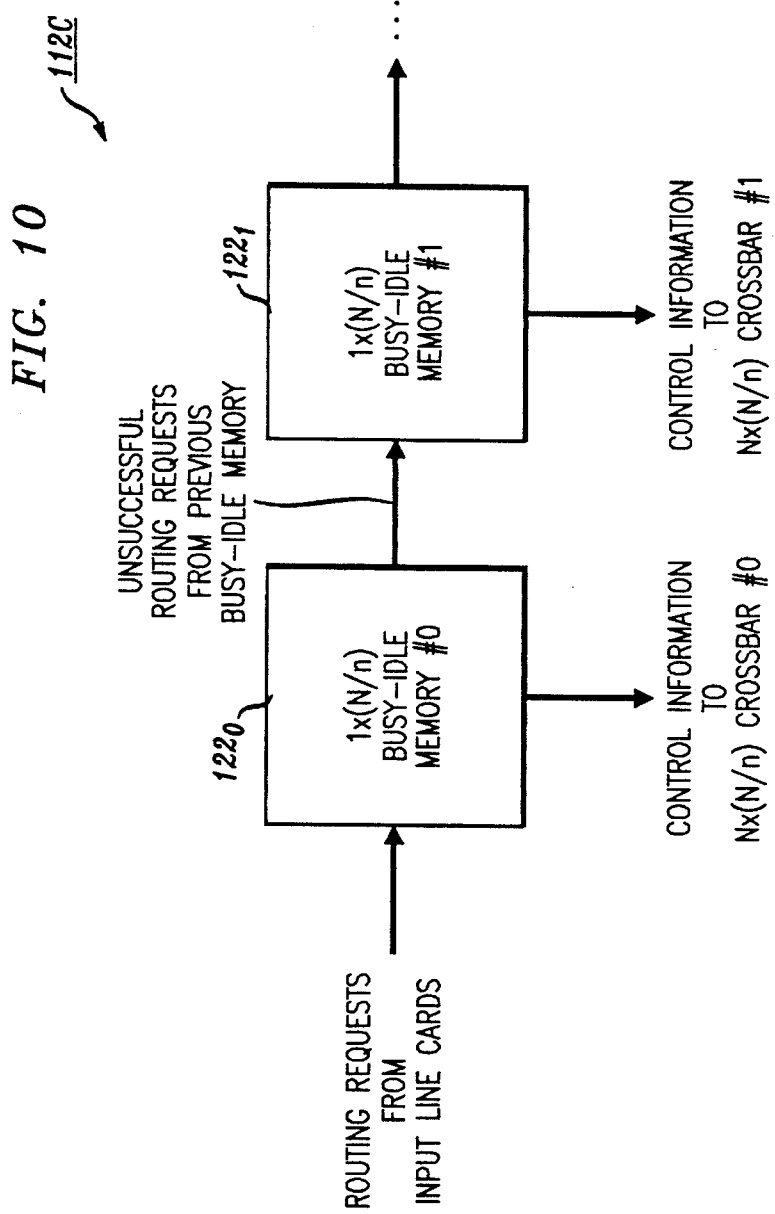
FIG. 10 is a detailed block diagram of the out-of-band controller shown in FIG. 9.
Figure 11:
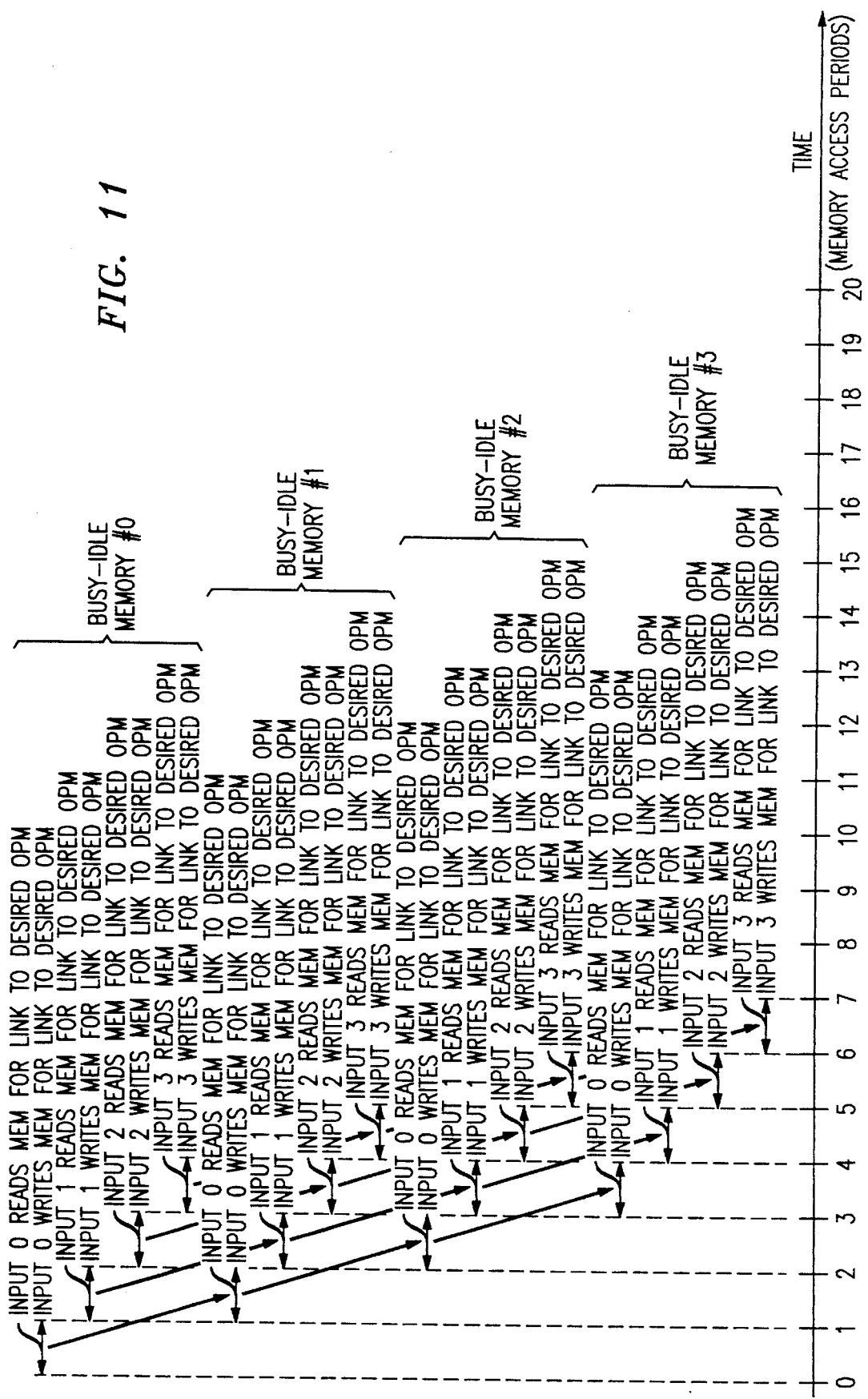
FIG. 11 is a timing diagram of an out-of-band controller according to FIG. 10, where the number of busy-idle memory units is four.

In another embodiment of the present invention shown in FIG. 9, the out-of-band controller 112C views the N×(Nm/n) crossbar distribution network 102C as the equivalent of m disjoint N×(N/n) crossbars. The resulting logical distribution network 102C provides one path from each of the m N×(N/n) crossbars to each of the (N/n) mxn output packet modules 104A. This embodiment of packet switch 100C requires the existence of m distinct links from each input line interface card $106C_0$–$106C_{N-1}$ with one link directed at each of the N×(N/n) crossbars. It also requires the out-of-band controller 112C to treat its large busy-idle memory as m busy-idle memories $122_0$–$122_{(m-1)}$ with N/n bits in each busy-idle memory $122_0$–$122_{(m-1)}$ as shown in FIG. 10. Each of the N×(N/n) crossbars is designated with the subscript number as its respective busy-idle memory $122_0$–$122_{(m-1)}$. This division and arrangement allows the out-of-band controller 112C to pipeline its tasks, with the busy-idle memory associated with a particular N×(N/n) crossbar viewed as one stage of the pipeline. For this embodiment, busy-idle memory accesses for one N×(N/n) crossbar can be made in parallel with busy-idle memory accesses for another N×(N/n) crossbar, because they will never share a common link to an output packet module 104A (shown in FIG. 9). As a result of this pipelining, each of the N path hunting operations within a single busy-idle memory $122_0$–$122_{(m-1)}$ will require only one memory access into the busy-idle memory for that particular N×(N/n) crossbar. Thus, the required memory access rate of each of the controller's busy-idle memory is advantageously reduced even further to (N+m-1) accesses per ATM cell interval. This is the case even though the overall system still must provide for Nm accesses every ATM cell interval. An example of timing for accesses to the busy-idle memories $122_0$–$122_{(m-1)}$ with m=4, n=2 and N=4 is illustrated in FIG. 11. The example shown in FIG. 11 shows improvement over the embodiment shown in FIG. 8 which was an improvement over that shown in FIG. 5.

Figure 12:
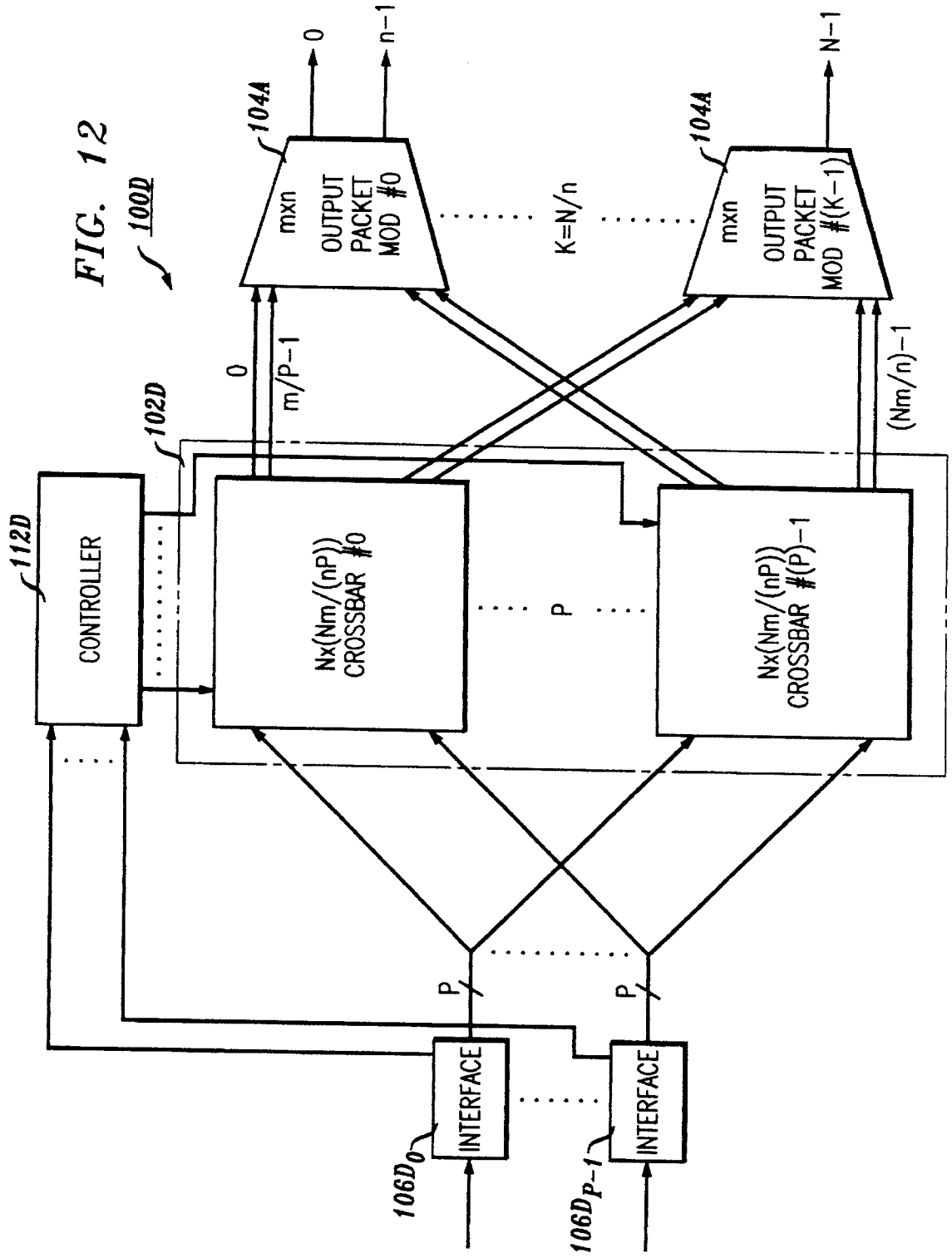
FIG. 12 is a block diagram of another embodiment of a packet switch according to the present invention which has the distribution network that is partitioned into multiple crossbar switches.
Figure 13:
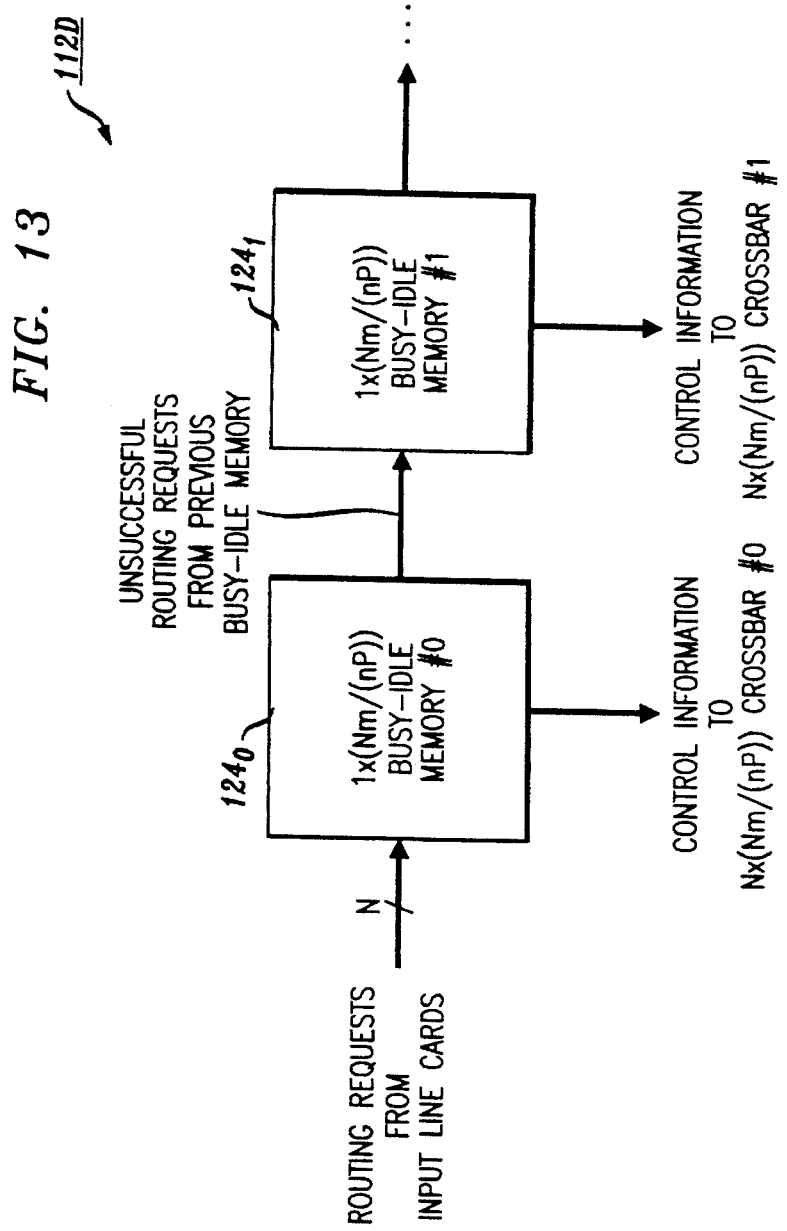
FIG. 13 is a detailed block diagram of the out-of-band controller shown in FIG. 12.

Yet another embodiment of the invention considers the N×(Nm/n) crossbar distribution network 102D to be P N×(Nm/(nP)) crossbars, where P is an integer ranging from 1 to m, as shown in FIG. 12. This logical view of the distribution network 102D provides m/P paths from each of the N×(Nm/(nP)) crossbars to each of the output packet modules 104A. Thus, m/P is required to be an integer. This embodiment of the crossbar distribution network 102D requires the existence of P distinct links from each input line interface card $106D_0$–$106D_{P-1}$ with one link directed at each of the N×(Nm/(nP)) crossbars. This embodiment also requires the out-of-band controller to treat its large busy-idle memory as P busy-idle memories with (Nm/(nP)) bits in each busy-idle memory $124_0$–$124_{P-1}$ as shown in FIG. 13. Busy-idle memories $124_0$–$124_{P-1}$ are labeled with numbers ranging from 0 to P-1, and the N×(Nm/(nP)) crossbar associated with each memory is designated with a similar number. This arrangement allows the out-of-band controller 112D to pipeline its tasks, where each of the busy-idle memories $124_0$–$124_{P-1}$ and its associated N×(Nm/(nP)) crossbars can be viewed as one stage of the pipeline. As a result of this pipelining, each of the N path hunting operations within a single memory will require m/P memory access into the busy-idle memory for that particular N×(Nm/(nP)) crossbar. All of the routing requests are sequentially passed from memory__0 to memory__1 to memory__2, etc., until each of the routing requests for a particular ATM cell interval have passed by all P of the busy-idle memories. Thus, the required access rate of each busy-idle memory $124_0$–$124_{P-1}$ is advantageously reduced to (N+P-1)(m/P) accesses per ATM cell interval, again even though the overall system still must provide for Nm accesses every ATM cell interval.

The parameter P will be known as the busy-idle memory partition parameter. It should be noted that modifications to P do not impact the cell loss probability of the distribution network 102D. Rather, modifications to P change the memory access time requirements of the busy-idle memories $124_0$–$124_{P-1}$ in the out-of-band controller 112D. So, memory components to perform this function exist and have reasonable costs.

Figure 14:
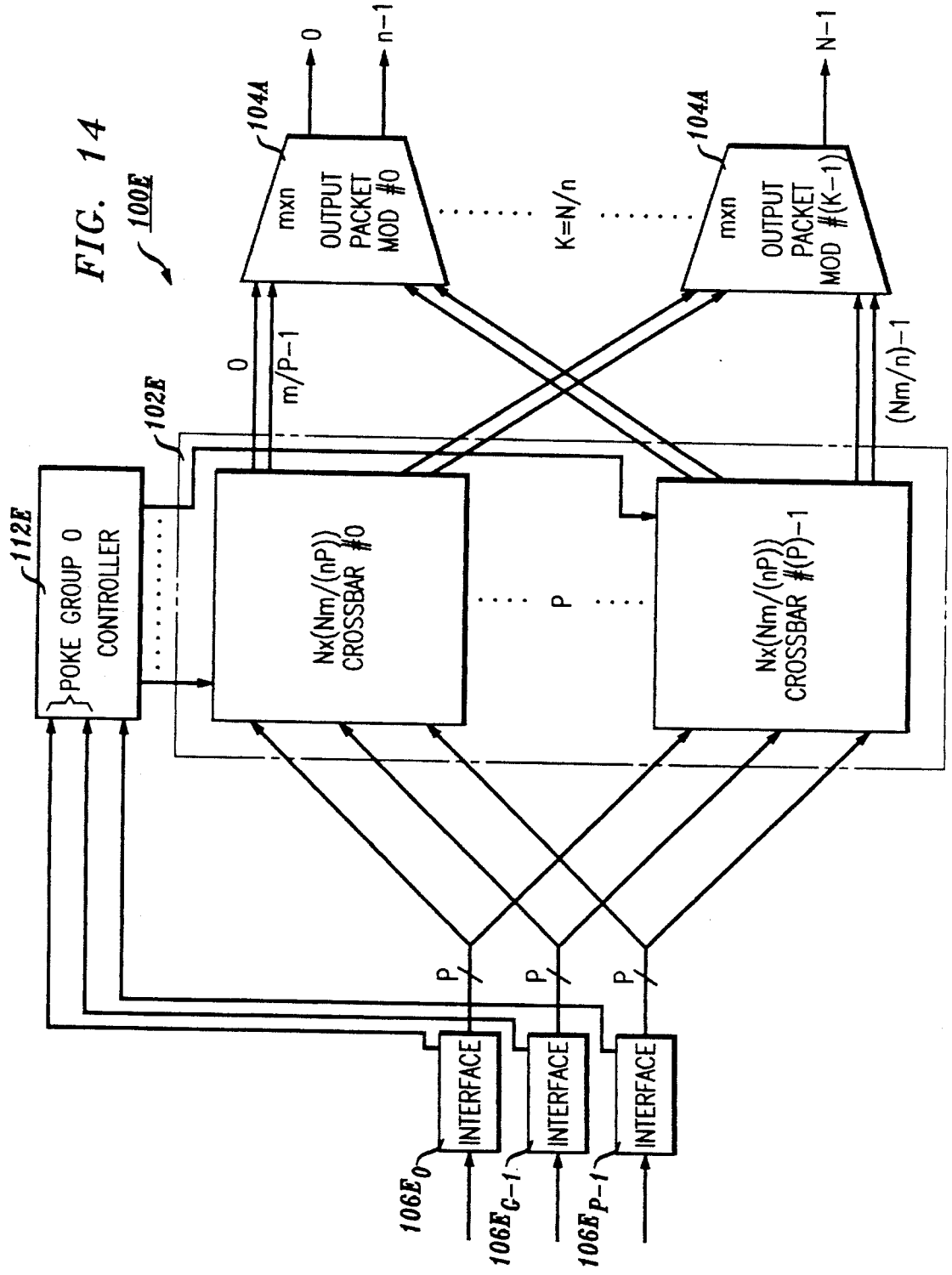
FIG. 14 is a block diagram of another embodiment of a packet switch according to the present invention which has the distribution network that is partitioned into multiple crossbar switches and interfaces divided into groups.

Since the partitioning allows almost any busy-idle access time requirement to be achieved in a cost effective manner for any size packet switch N, the next issue is how to reduce the cell loss probabilities for a growable packet switch. Referring now to FIG. 14, plots of cell loss probabilities P(B) according to the previously presented equations, for large N and the loading $R_L$=1.0, are shown. From these plots it can be seen that larger values of n require smaller values of m/n to produce a particular cell loss probability P(B). As a result, a distribution network (whose size is given by N×(Nm/n)) can be made smaller. However, larger values of n also require more complicated functionality and higher cost within the mxn output packet modules 104A. Conversely, smaller values of n lead to smaller, less expensive output packet modules 104A, but instead lead to larger values of m/n and correspondingly larger distribution networks 102–102D. As a result, in order to decrease the cell loss probability of a standard growable packet switch the overall system hardware cost must be increased by either increasing the m/n value (which leads to a more complicated distribution network) or increasing the value of m (which leads to a more complicated output packet module design). Oftentimes, these design tradeoffs lead to an undesirable compromise between the distribution network size and the output packet module size that is required to produce the desired cell loss probability.

For example, if a growable packet switch has n=8, FIG. 14 indicates that for n values of this size, acceptable cell loss probabilities, i.e. cell loss probabilities less than $10^{-9}$ will require an m/n ratio to be approximately four. The resulting output packet module size is then fixed at 32×8, and the resulting distribution network size is also fixed at N×(4N). If the design requirements change to provide even lower cell loss probabilities, then the m/n value and the associated distribution network size can be increased, and/or the n value and the associated output packet module size can be increased. Either or both of these changes can lead to relatively substantial increases in the overall system level cost.

Because of the undesirable increases in hardware cost that result from the standard tradeoff for reducing cell loss probabilities described above, the present invention provides an embodiment that reduces the cell loss probabilities within a single-stage growable packet switch without substantial increase in overall system costs. The present invention allows the reduction of the cell loss probabilities within a particular growable packet switch design (with fixed values of N, n, and m) without requiring modification of the distribution network design parameters. The present invention also has only a slight impact on the hardware required for the out-of-band controller, the input line interface cards, and the output packet modules.

Figure 15:
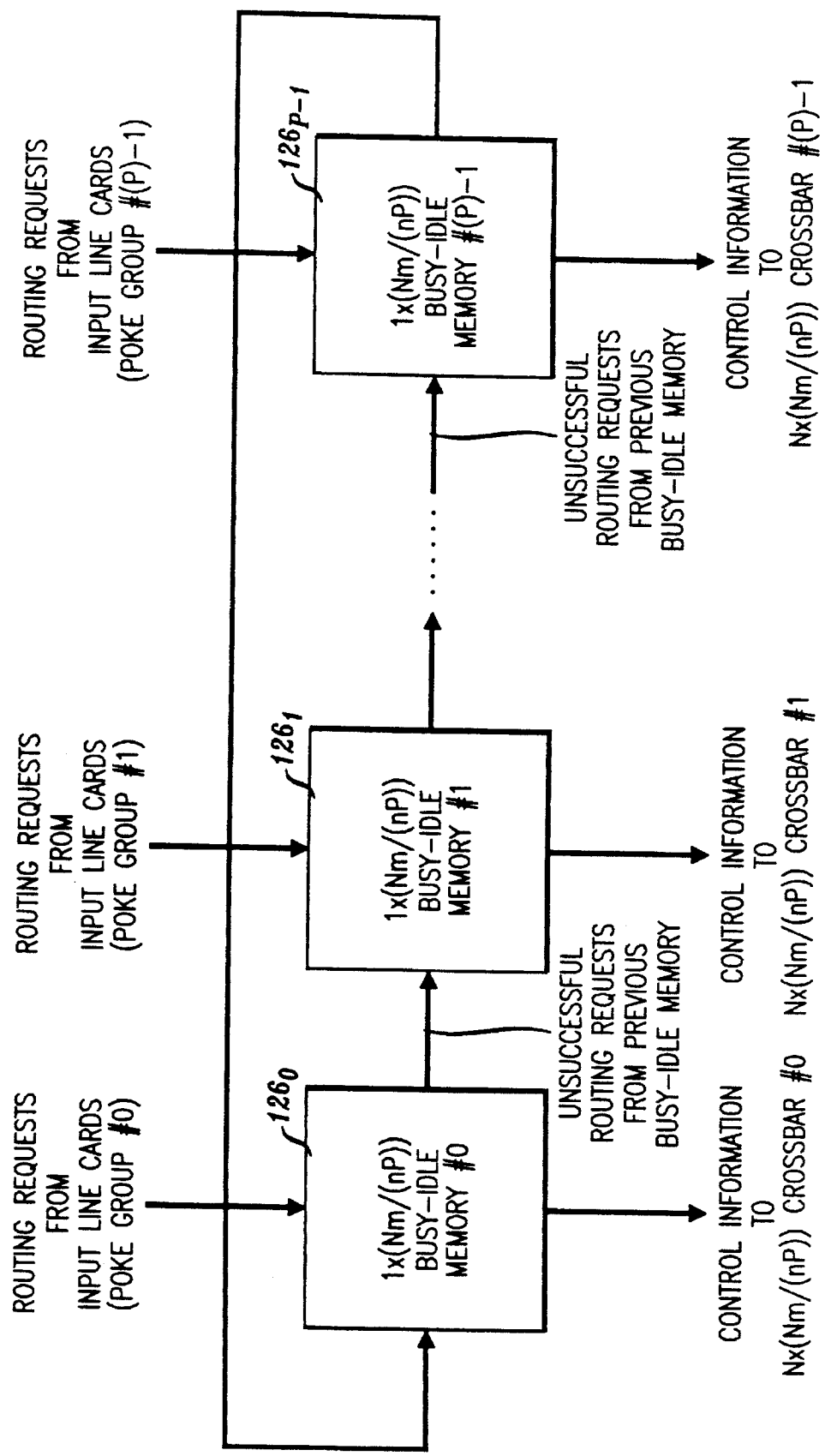
FIG. 15 is a detailed block diagram of the out-of-band controller shown in FIG. 14.
Figure 16:
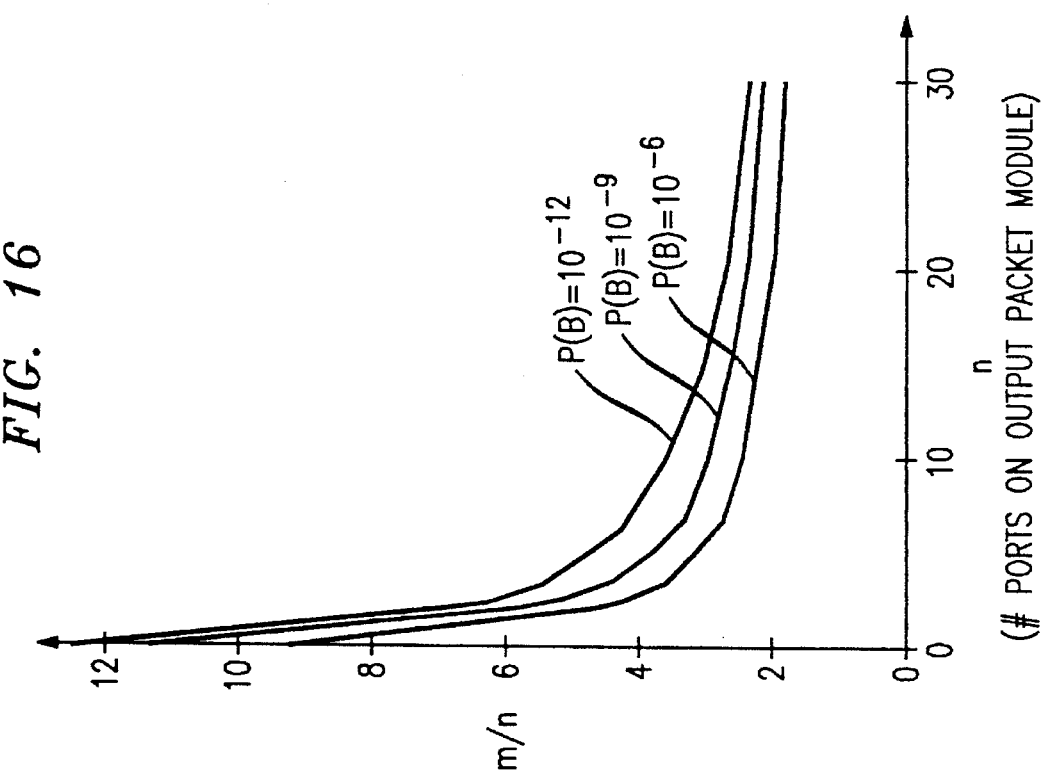
FIG. 16 is a plot of cell loss probabilities for the packet switch embodiment shown in FIG. 14 for various dimensions of its output packet modules and distribution network.

Referring now to FIG. 15, one particularly cost-effective way to reduce cell loss probabilities requires the out-of-band controller 112E to simply change the order in which it performs the path hunts in the P busy-idle memories. In the embodiments that were described previously, the out-of-band controller 112A–112D simply streamed each of the routing requests through each of the P memories in a sequential fashion, so each of the routing requests visited memory 0 first, memory_1 second, etc. This approach has several distinct traits, some advantageous, some disadvantageous. First, it tends to pack most of the routed ATM cells in the N×(Nm/(nP)) crossbar associated with the first busy-idle memory, and the distribution network resources, especially those associated with the last busy-idle memory, are not fully utilized. This approach also results in unfair cell loss probabilities, because the out-of-band controller 112A–112D gives preference to routing requests that are injected into the pipeline before other routing requests.

Referring now to FIG. 15, a packet switch 100E that has an out-of-band controller 112E that spatially distributes the traffic evenly across all P of the N×(Nm/(nP)) crossbars of distribution network 102E so that each N×(Nm/(nP)) crossbar will carry approximately 1/P of the traffic load. The out-of-band controller 112E also guarantees that each routing request will have an opportunity to attempt path hunts in each of the P busy-idle memories of the controller 112E. In order to provide these functions, the out-of-band controller 112E routes the routing requests to its P busy-idle memories in a different order than the sequential order of the previous embodiments. The order in which routing requests are routed through the busy-idle memories will be directly determined by the source of the routing request- i.e., the input port from which it was generated. Different groups of routing requests from inputs will therefore be routed through the busy-idle memories of the controller 112E in different orders. However, it is possible that two or more of the routing requests will be routed (or poked) through the P busy-idle memories in exactly the same order. Routing requests that are routed through the P busy-idle memories together have a very special relationship to one another, and they are defined as poke groups G, with each poke group being a sub-set of the N original request vectors that are routed through the P busy-idle memories in exactly the same order. Thus, if a routing request originating from input port 1 is passed through the P=4 busy-idle memories in the order: memory_1, memory_2, memory_3, memory_0, and if the routing request originating from input port 5 is passed through the P=4 busy-idle memories in the order: memory_1, memory_2, memory_3, memory_0, then the routing requests from input port 1 and input port 5 are said to be in the same poke group. Designs of controller 112E are greatly simplified if each of the poke groups has exactly the same number of elements, although this is not an absolute requirement. If the controller 112E follows this rule, then all of the N original routing requests can be divided into G poke groups and each poke group will contain N/G elements.

Controller 112E also is found to work well if each routing request is routed from busy-idle memory X to busy-idle memory $(X+1)_{\{MODULO\ P\}}$, where $A_{\{MODULO\ B\}}$ is the integer remainder of the quotient A/B.

Figure 17:
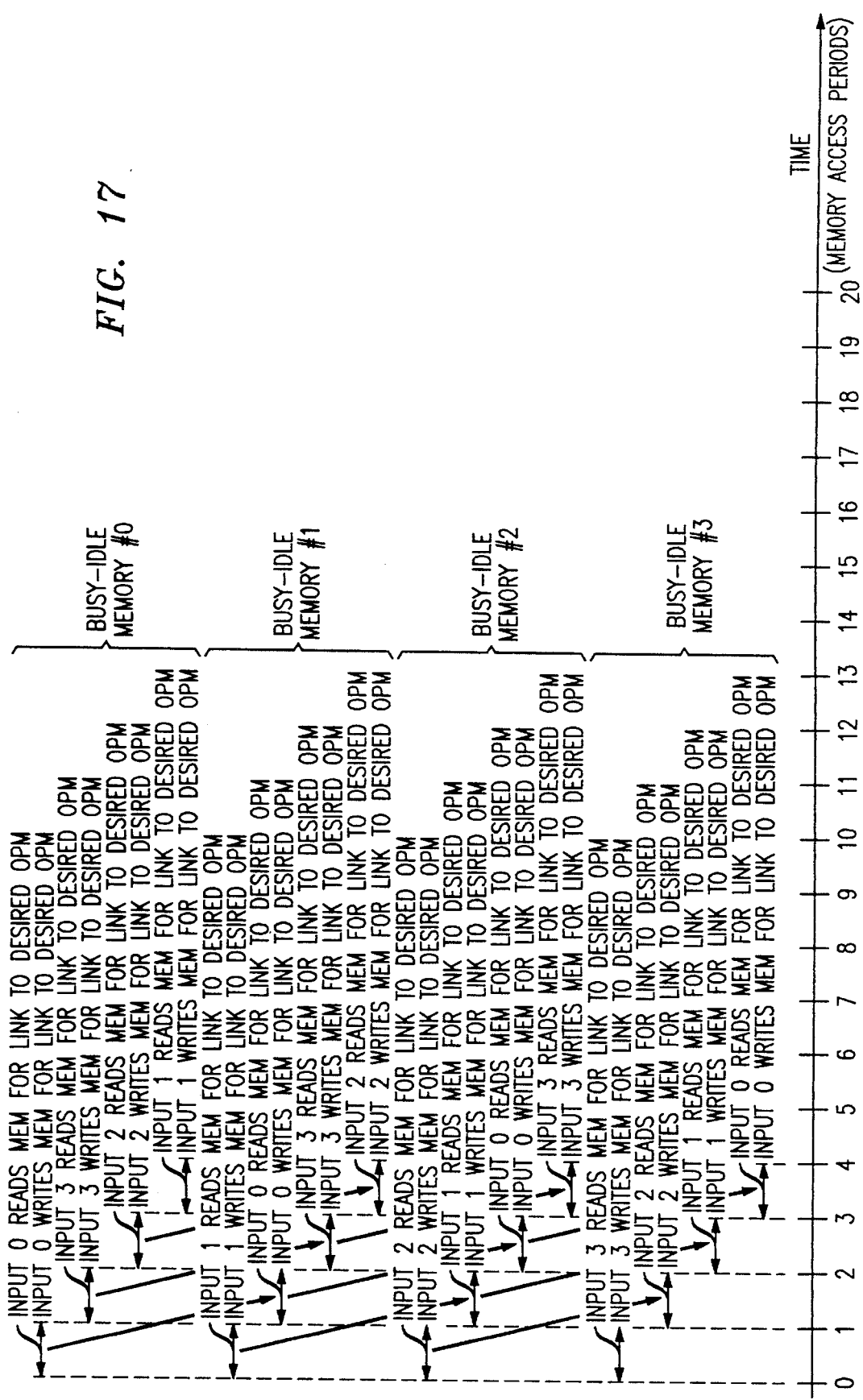
FIG. 17 is a timing diagram of an out-of-band controller according to FIG. 15, where the number of busy-idle memory units is four.

The timing diagram in FIG. 17 illustrates the way that out-of-band controller 112D passes routing requests through the P=4 busy-idle memories $124_0$–$124_{p-1}$ (see FIG. 13). In poke group terminology, the timing diagram of FIG. 11 has G=1 poke groups, and each poke group contains N=4 elements. FIG. 17 illustrates an alternative way of routing the routing requests through the P=4 busy-idle memories, and it can be seen that this way has G=4 poke groups of size N/4=1. In particular, it is specified that the routing requests from input port 0 are in the first poke group, all of the routing requests from input port 1 are in a second poke group, all of the routing requests from input ports numbered 2 are in a third poke group, and all of the routing requests from input ports numbered 3 are in a fourth poke group, (Note: The actual mapping of input ports into poke groups can be specified by the system architect in many different ways).

The first poke group passes through memories_0,_1,_2, and _3.

The second poke group passes through memories_1,_2, _3, and _0.

The third poke group passes through memories _2,_3, _0, and _1.

The fourth poke group passes through memories _3,_0, _1, and _2.

It can be seen from the FIG. 17 timing diagram, that the routing requests for two different poke groups never occupy the same busy-idle memory at the same time. The timing diagram of FIG. 17 is re-drawn in a slightly different fashion in FIG. 18). FIG. 18 illustrates that the routing requests that leave busy-idle memory_3 always are routed back to busy-idle memory_0, so all the busy-idle memories $126_0$–$126_{p-1}$ of controller 112E should be connected in a ring fashion, as shown in FIG. 18. The different poke groups are poked into the ring at the locations of different busy-idle memories $126_0$–$126_{p-1}$.

While the above described embodiments of growable packet switches with out-of-band controllers are new-and provide some advantages, they provide only small improvements in the performance, i.e. cell loss probability, of the network. However, one further embodiment of the present invention leads to substantial advantages in system performance. This embodiment includes an advantageous feature called rolling the routing requests. Rolling is possible primarily because of the swiftness of the out-of-band controller and its busy-idle memories.

Rolling recognizes that every routing request is associated with a particular ATM cell interval. If a particular routing request was derived from an ATM cell that arrived during the i-th arrival interval, then that routing request is associated with the i-th ATM cell interval. As mentioned above, up to a total of N routing requests can be induced by arriving ATM cells during any particular ATM cell interval. Before the rolling of routing requests, it was assumed that if an ATM cell arrived during the i-th arrival interval, then it would be routed through the distribution network (with all of the other ATM cells that arrived during the i-th arrival interval) during the i-th routing interval. The i-th routing interval was assumed to be a fixed interval of time $\Delta T$ after the i-th arrival interval. The presence of the fixed-length FIFO on the input interface card permitted each ATM cell to be stored in its respective interface card until the out-of-band controller set up the appropriate path, but ALL cells were held in their respective FIFOs for the same period of time, $\Delta T$, and no longer.

Figure 19:
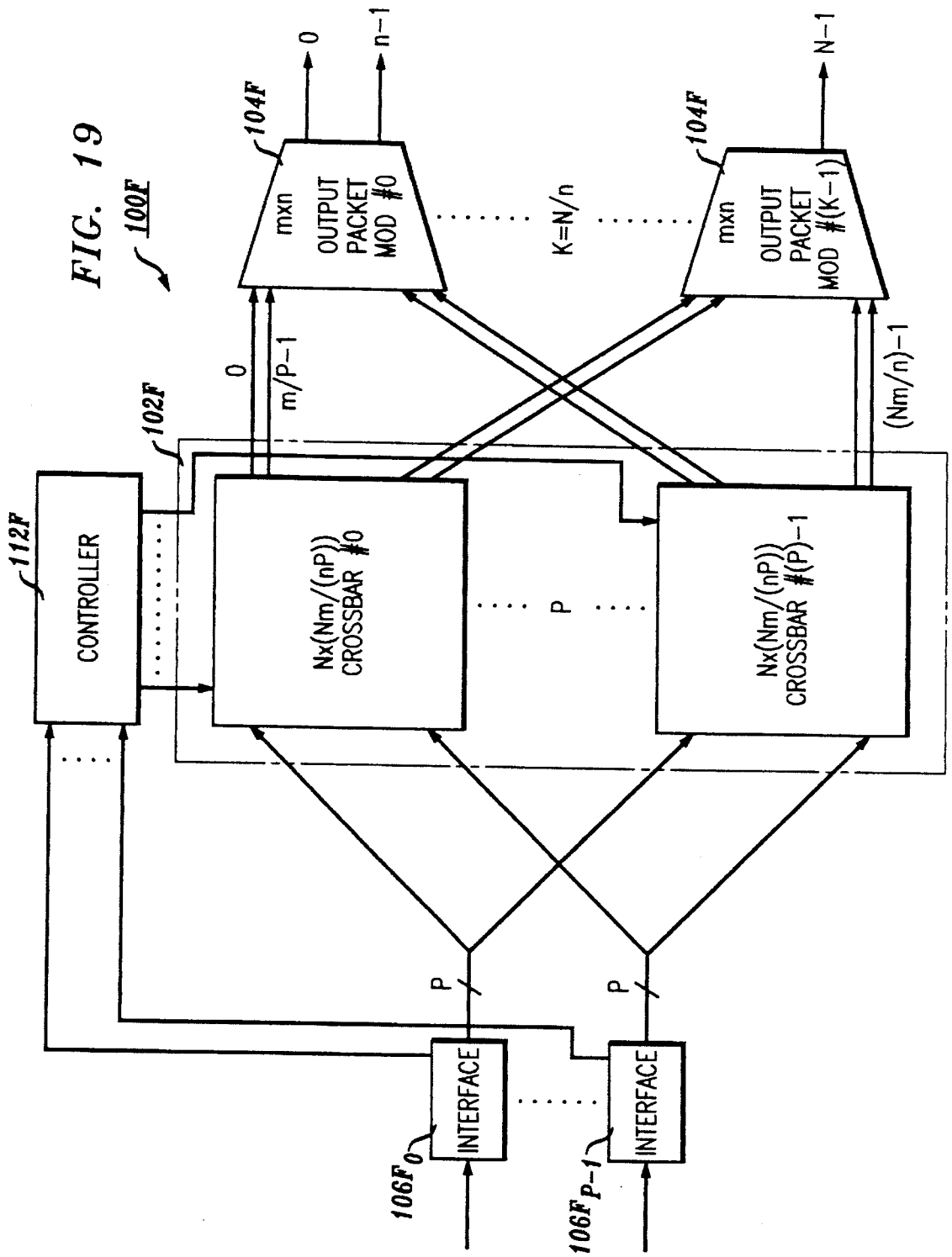
FIG. 19 is a block diagram of another embodiment of a packet switch according to the present invention which has the distribution network that is partitioned into multiple crossbar switches, interfaces that are divided into groups and an out-of-band controller which rolls routing requests among two time intervals.
Figure 20:
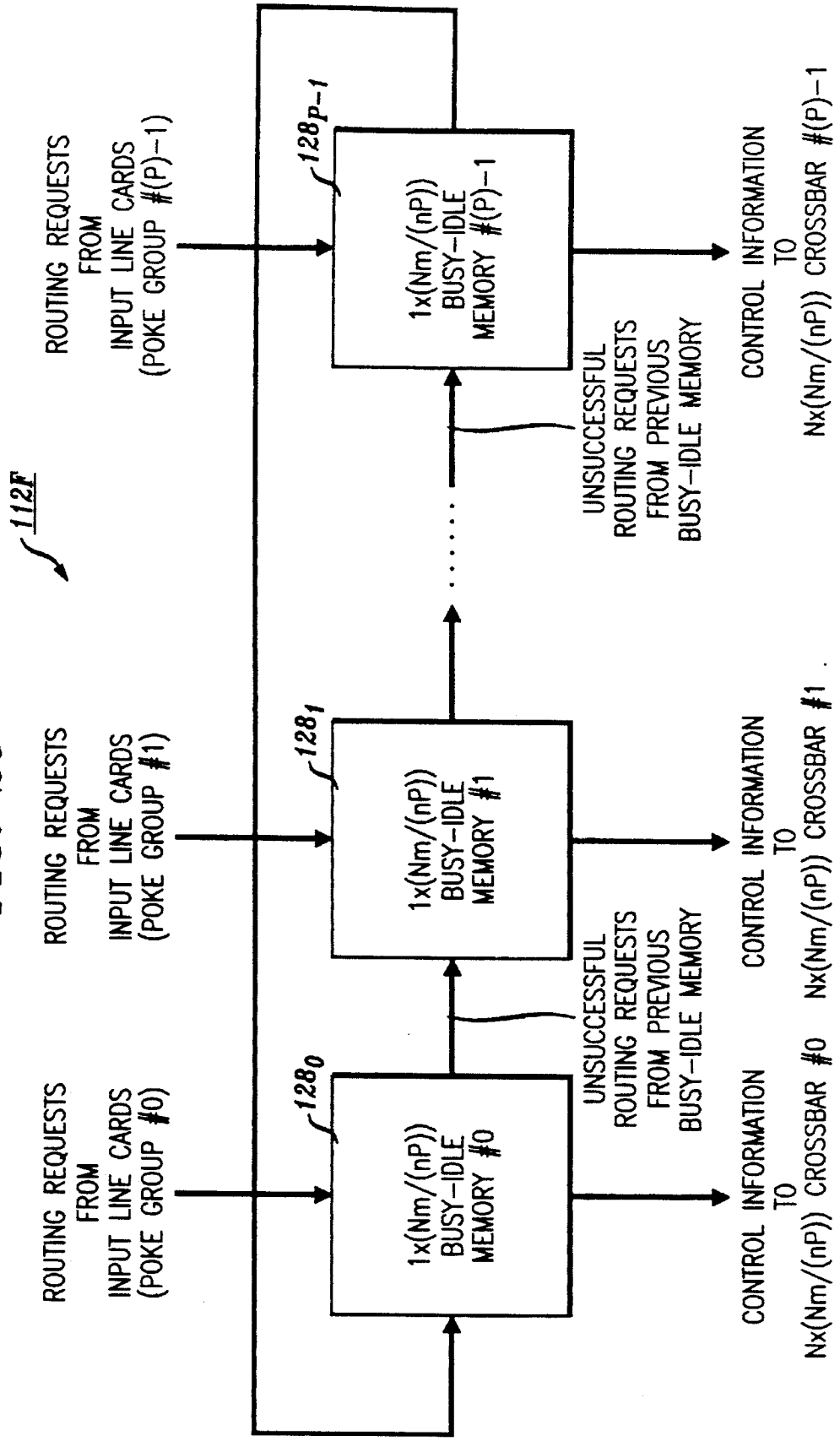
FIG. 20 is a detailed block diagram of the out-of-band controller shown in FIG. 19.

Referring now to FIGS. 19 and 20, rolling changes that and allows routing requests that are unable to find a route through the distribution network 102F during the i-th interval to hunt for and find a route through the distribution network 102F during the (i+1) interval.

A specific embodiment of packet switch 100F implements rolling by requiring any routing request that arrive during the i-th arrival interval which passes from busy-idle memory_(P-1) to busy-idle memory_0 to attempt to locate available paths through the remaining $N \times (Nm/(nP))$ crossbars not for routing during the i-th interval, but instead liar routing during the (i+1) interval. For example, assume the second poke group in FIG. 17 contains a group of routing requests that were derived from ATM cells that arrived during the i-th arrival interval. Each of the routing requests in this poke group will attempt to locate idle paths for the i-th routing interval within busy-idle memories_2 and _3. However, unfulfilled routing requests of the second poke group will attempt to locate idle paths for the (i+1) routing interval within busy-idle memories_0 and _1. The effects of rolling on the timing diagram of FIG. 18 are illustrated in the similar timing diagram of FIG. 21. As seen in the timing diagrams, the ring-like ordering of the path hunts is still maintained, but the busy-idle memories $128_0$–$128_{p-1}$ must be cleared at appropriate points in the timing diagram to transition the busy-idle tables from holding busy-idle bits associated with the i-th routing interval to holding busy-idle bits associated with the (i+1) routing interval.

It should be noted that a particular poke group will always contain N/G routing requests and each request may need to do (m/P) memory accesses, so the poke group can tie up a busy-idle memory for a lengthy period of time while all of the (N/G)(m/P) memory accesses are being processed. The timing within the pipeline can still maintain a smooth data flow if slight delays are added between the arrival of the elements within the poke groups.

Figure 22:
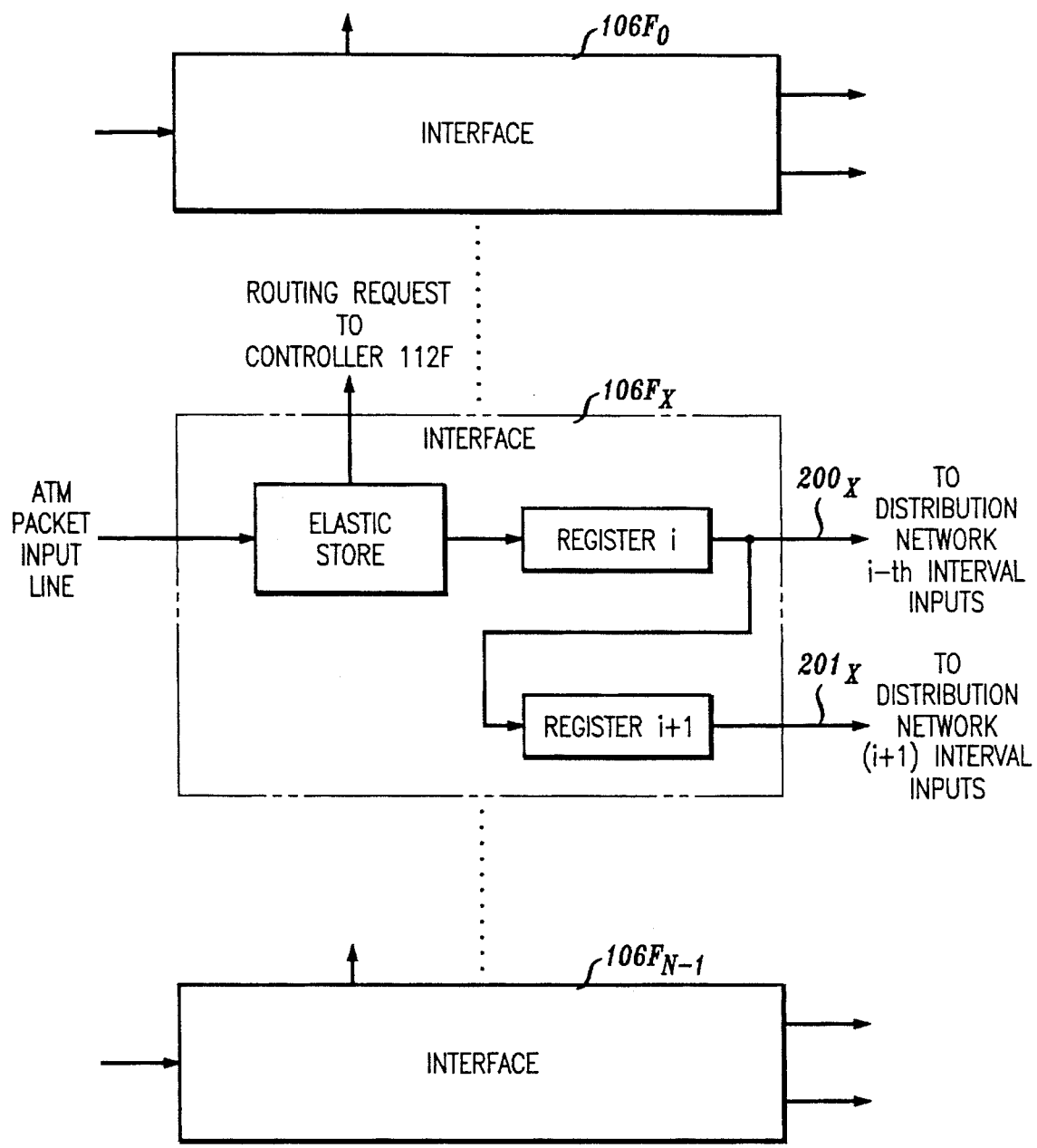
FIG. 22 is a detailed block diagram of the interface shown in FIG. 19 showing the registers and output connections used for rolling of routing requests.

To gain the advantages of rolling requires only four minor physical additions are made to the system hardware: 1) the out-of-band controller 112F must extract the control information and clear the busy-idle bits for each of the busy-idle memories $128_0$–$128_{p-1}$ at slightly different times (as shown in the timing diagram of FIG. 21), 2) the output packet modules 104F must accept the ATM cells from the distribution network outputs in a particular order to guarantee proper ATM cell ordering, 3) the input line interface cards $106F_0$–$106F_{p-1}$ must provide a fixed delay of exactly one ATM cell interval (in addition to the aforementioned delay $\Delta T$) for some of the inputs to inject the ATM cells into the distribution network 102F at the appropriate time in the (i+1) routing interval (such an input line interface card is shown in FIG. 22), and 4) each input line interface card $106F_0$–$106F_{N-1}$ has two distinct output connections $200_0$–$200_{N-1}$ and $201_0$–$201_{N-1}$ (one for each of the two cells that may need to be simultaneously transmitted to the distribution network 102F).

The input line interface cards in poke group 0 do not need the second output since they never roll to the (i+1) interval, but all the other poke groups need two outputs and poke group 0 may have the same configuration for standardization of ports. The first of these additions in the switch 100F is very low in cost: it merely changes the timing of the processor (or state machine) within controller 112F that clears the busy-idle memories $128_0$–$128_{p-1}$ at the end of each ATM cell interval.

The second addition is also very low in cost. It requires that each output packet module as it extracts the ATM cells from the connecting links, that it extract ATM cells from the links that are attached to the lowest numbered $N \times (Nm/(nP))$ crossbar first, and from the links that are attached to each successively higher-numbered crossbar thereafter. This maintains proper cell ordering through the packet switch 100F without the use of time stamps.

The third addition is also low in cost. Depending on the poke group to which its routing request is assigned during system design, a particular input line interface card $106F_0$–$106F_{N-1}$ might delay one of its outputs for $\Delta T$ and another of its outputs for $\Delta T$+(1 ATM cell interval). Thus, at most a single cell of buffering is added to each input line interlace card as a memory requirement (but not for poke group zero where it is a standardization requirement).

The fourth addition also adds a relatively low incremental cost (doubling the number of links between line interface cards and crossbars) to the overall system hardware.

The third and fourth additions can also be implemented in a different fashion which does not require modifications to the input line interface cards. If each crossbar is designed with delay lines in series therewith, then each input line interface card injects the cell into a different part of the distribution network, and the cell merely circulates through the distribution network following a ring path in the same manner that its routing requests circulated through the busy-idle memories. Using this approach, the busy-idle memories could be physically located with their associated crossbars, and the routing requests could be prepended to the cells. The result would be a self-routing packet switch using the rolling of routing requests.

When the ability to roll a routing request into a later time interval is added to the growable packet switch, the results are noticeable changes to the network's traffic distribution. The out-of-band controller 112F tends to temporally distribute the traffic that arrives in a given ATM cell interval across two ATM cell intervals so that the traffic load can be effectively decreased in an occasional ATM cell interval when an unusually high volume of traffic exists and is destined for a particular output packet module. This effective lowering of the traffic load (within an ATM cell interval) is accomplished by adding a fixed (but different) delay to each of the ATM cells arriving during a particular ATM cell interval. If a congested interval occurs, then some of the cells are delayed until the next consecutive ATM cell interval when the traffic load competing for the popular resources. i.e. links to the popular output packet modules, will statistically be more likely to be lower, so the delayed cells should have a higher probability of being routed in the next ATM cell interval. In fact, rolling can even help improve the performance of the growable packet switch architecture beyond a previous barrier. As an example, assume X ATM cells enter the switch during arrival interval i and are destined for the same mxn output packet module. Even if X>m, which is an output packet module overload condition, rolling permits m of them to be routed during the i-th routing interval and the remaining X-m of them can be routed during the (i+1) routing interval. If this condition (with X inputs destined for a particular output packet module) remains for an extended period of time (due to bursty traffic), then (X-m) cells will be rolled into the next routing interval after the first occurrence, 2(X-m) cells will be rolled into the next routing interval after the second occurrence, and j(X-m) cells will be rolled into the next interval after the j-th occurrence. This situation can be accommodated by the rolling of requests as long as the number of cells that are rolled into the next interval is less than or equal to m.

In addition to temporally distributing the cell load, rolling of the routing requests within the out-of:band controller also guarantees that there is a simple technique for maintaining the ATM cell ordering when an ATM stream is reconstructed at the output packet module (even if rolling causes some of the ATM cells within the stream to be delayed differently than others). Fortunately, this technique does not require the addition of time-stamps to the actual ATM cells before they are passed through the distribution network, because techniques based on time-stamps tend to result in more complicated re-shuffling hardware within the output packet modules. In general, the manner in which routing requests are fed through the busy-idle memories and the reading of ATM cells (by the output packet module) from the lowest-numbered crossbar to the highest-numbered crossbar guarantees that cells will remain in temporal order.

Rolling also guarantees that the out-of-band controller 112F will attempt to route every ATM cell through each of the available paths to its desired output packet module, but each of the successive path hunting attempts in different busy-idle memories will occur in a more lightly-loaded memory. This is a direct result of the manner in which busy-idle memories are cleared. This approach is similar to path hunting techniques that pack as many calls as possible in one portion of the network. This often results in lower blocking probabilities, because each ATM cell has a very high probability of being successfully routed in its latter path hunt attempts. The use of rolling allows this to be accomplished while still maintaining a relatively uniform distribution of the traffic throughout all P of the N×(Nm/(nP)) crossbars. The ultimate result of all this is that the cell loss probability in the distribution network 102F is substantially reduced.

In Operation:

The timing diagram in FIG. 21 illustrates that a particular poke group will always move from a busy-idle memory which is more heavily loaded with busy-idle bits set by previous routing requests toward busy-idle memories that are less heavily loaded. If fact, each poke group always encounters an unloaded busy-idle memory in its final (P-th) attempt, because each of the busy-idle memories is scheduled to be cleared just before a poke group arrives for its P-th attempt at fulfilling a routing request. As a result, the addition of rolling in the out-of-band controller's scheduling algorithm can result in extremely low cell loss probabilities even during a transient cell interval when the traffic load is extraordinarily high.

Unlike non-rolling growable packet switches 100–100E, the resulting cell loss probability in of distribution network 102F with K=N/n, mxn output packet modules will be a function of the number of partitions (P) used when rolling through the busy-idle memory and the number of poke groups (G). If the busy-idle memory is partitioned into P=m partitions, and if the number of poke groups (G) selected is G=m, then the resulting crossbar distribution network 102F must be partitioned into P=m disjoint N×(N/n) crossbars. With this arrangement, the cell loss probability of the resulting network can be calculated. The cell loss probability is given by:

$$P(\text{cell loss}) = [1/\{R_L\}] \left[ (1 - R_L/K)^{N/m} \left( Km/\left[ N\left(1 + \sum_{i=1}^{m-1} C_i \right) \right] - (Km/M - R_L) \right) \right]$$

where:

$$C_1 = [K/(K-R_L)]^{N/m - R_L N/[m(K-R_L)] - 1}$$

and where:

$$C_{i+1} = [K/(K - R_L)]^{N/m} - [(R_L)/(K - R_L)]^{i+1} [(N/m)!/[(N/m - (i+1))!(i+1)!]] - \sum_{q=1}^{i} [(N/m)!/[(N/m - (q))!(q)!]] [R_K/(N - R_L)]^k C_{(i+1-q)}$$

Figure 23:
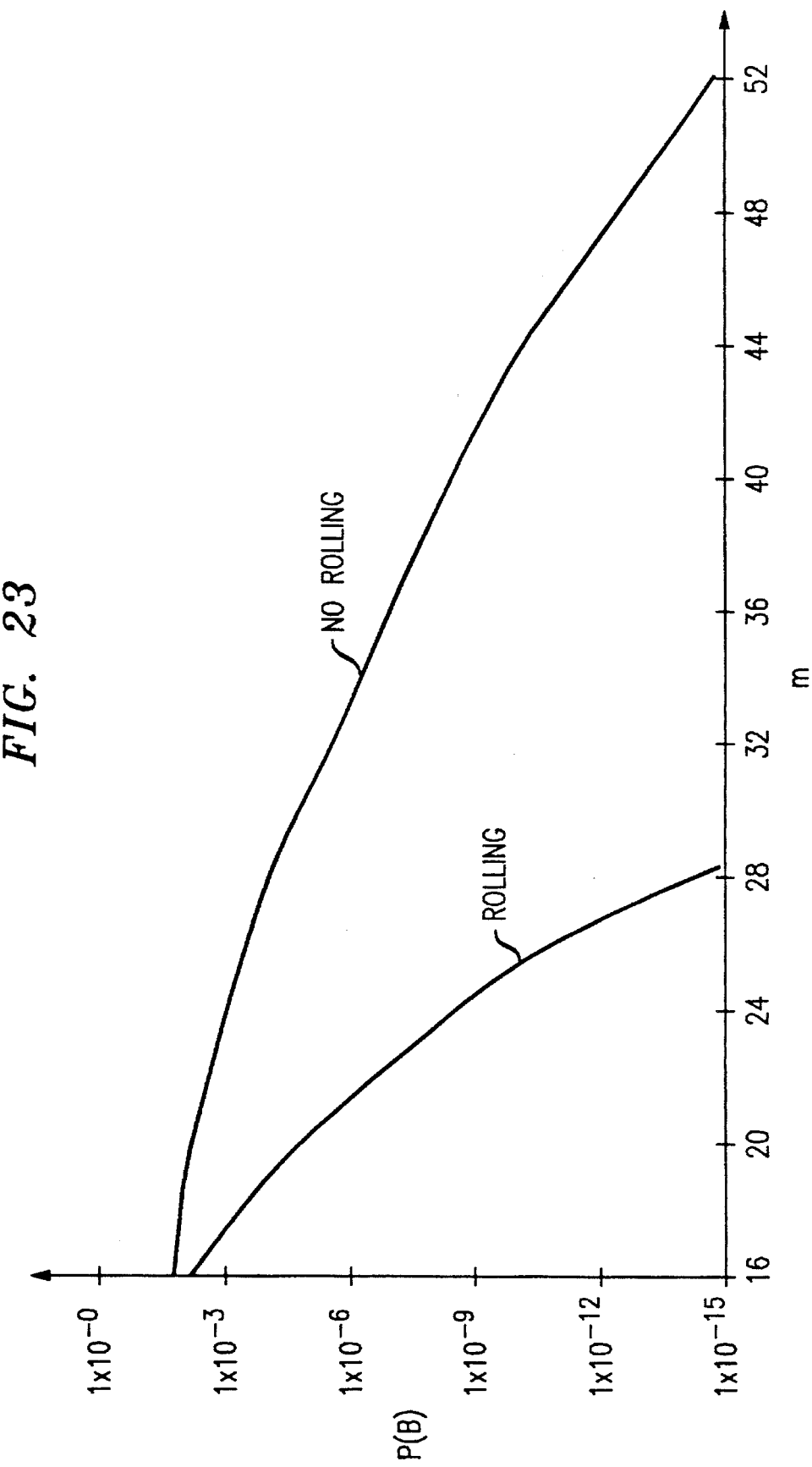
FIG. 23 is a plot of ATM cell loss probability versus the number of output packet module inputs showing the advantages of rolling of routing requests.
Figure 24:
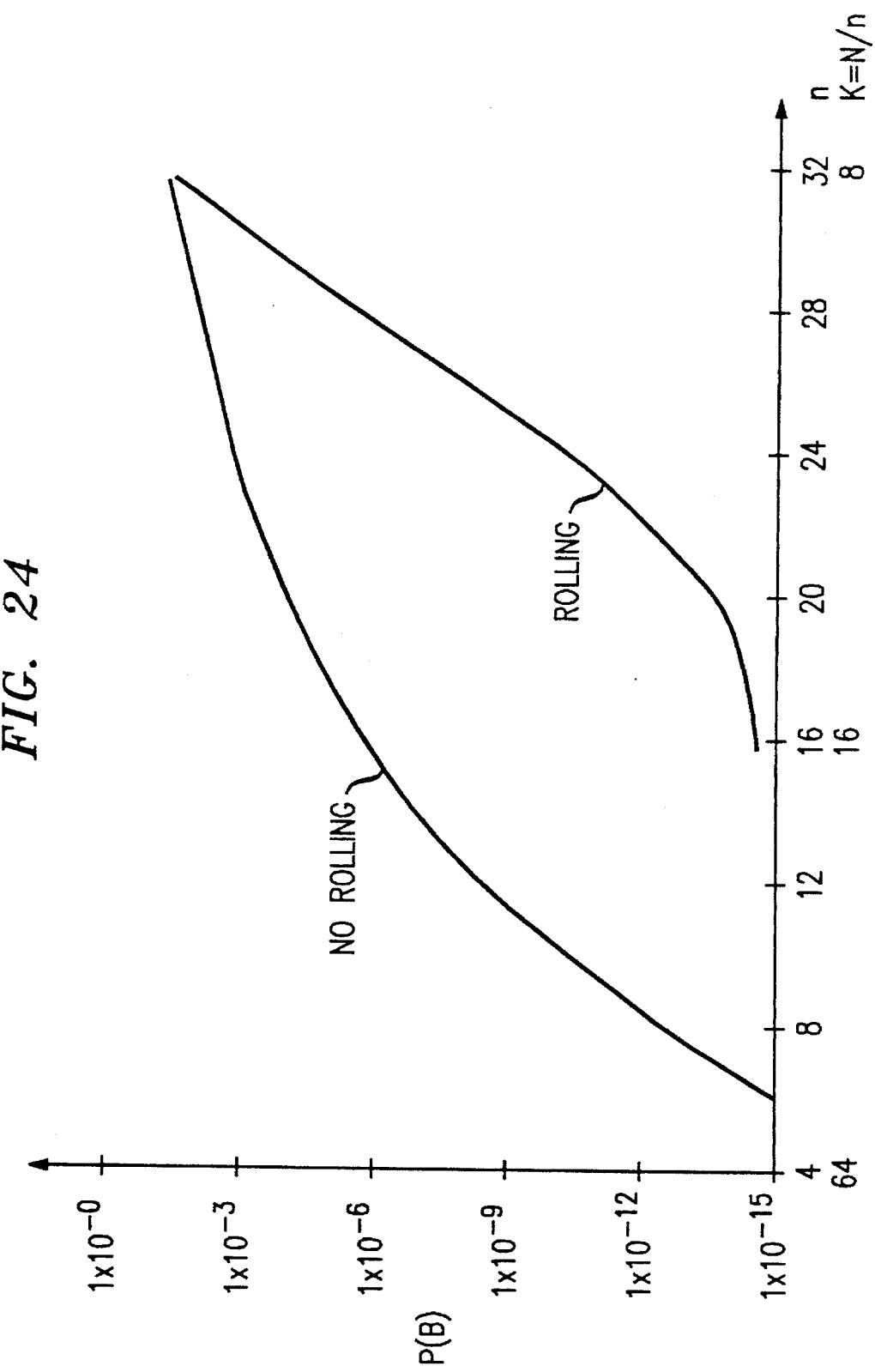
FIG. 24 is a plot of ATM cell loss probability versus the number of output packet module outputs and a design parameter K.

Each of the $C_i$ terms can be determined in an recursive fashion from the equations for $C_1$ and $C_{i+1}$. In this manner, the cell loss probability for distribution networks with rolling of requests can be determined. For example, an N=256 input distribution network with n=16 has K=N/n=16 and a cell loss probability which is a function of the number of output packet module inputs m as shown in FIG. 23. Similarly, if m=32, the cell loss probability for an N=256 input distribution network is shown as a function of n (or K) in FIG. 24. These figures show the cell loss probabilities of the distribution network 102–102E that does not use rolling and the other is an equivalent distribution network 102F that does use rolling. The advantages of rolling the routing requests of a network is an overall decrease in the cell loss probability for a given number of input lines N, output packet module inputs m, output packet module outputs n is readily demonstrated. Since the costs associated with implementing rolling are fairly insignificant, i.e. one extra cell of memory in the input line interface cards $106F_0$–$106F_{N-1}$, special synchronization of routing request and clearing of memories in the controller 112F, and orderly reading of cells from the distribution network outputs by the output packet modules 104F, the present invention provides a very advantageous manner of reducing the cell loss probability in a large ATM network, especially those using crossbar switches.

Thus, it will now be understood that there has been disclosed an apparatus and method for reducing data losses in a growable packet switch. While the invention has been particularly illustrated and described with reference to preferred embodiments thereof, it will be understood by those skilled in the art that various changes in form, details, and applications may be made therein. For example, the crossbar switches could be photonic just as easily as they could be electronic. It is accordingly intended that the appended claims shall cover all such changes in form, details and applications which do not depart from the true spirit and scope of the invention.

What is claimed is:

1. A growable packet switch for switching packets of data from a plurality of input lines to a plurality of output lines, comprising:

a plurality of input interfaces, each having an input port connected to a respective input line of said plurality of input lines, and an output port;

a single stage distribution network for switching a plurality of I network input ports to a plurality of L network output ports thereof;

each of said input interfaces having a store therein for holding a packet of data until the packet of data is routed to the network;

each of said plurality of input interface output ports fanning out to a respective group of F of said I network input ports of said single stage distribution network;

said single stage distribution network having a plurality of P partitions, where P is an integer;

a plurality of output modules, said output modules together having a plurality of inputs, each of said output module inputs connected to respective network output port of said plurality of L network output ports, and together having a plurality of outputs, each of said output module outputs connected to a respective output line of said plurality of output lines;

an out-of-band controller having a plurality of busy-idle memory units equal in number to the number of partitions P, each of said busy-idle memory units controls the routing of data packets through its respective partition;

each data packet routing request that is made in an i-th time interval has a route determined in the i-th time interval, the next subsequent time interval or is dropped; and each partition of said P partitions having at least one path that is connectable to provide a connection for a data packet from each of the plurality of input lines to a respective output line of the plurality of output lines.

2. The growable packet switch for switching packets of data from a plurality of input lines to a plurality of output lines according to claim 1, wherein;

each of said inputs of each of said output modules has a respective FIFO; and each of said output modules takes data from said FIFOs such that a cell communicated via an input line in the i-th interval that was routed in the next interval after the i-th interval will be output to the desired output line before any other cell that is communicated via said input line in any interval after the i-th interval.

3. The growable packet switch for switching packets of data from a plurality of input lines to a plurality of output lines according to claim 1, wherein said single stage distribution network is a single electronic crossbar switch.

4. The growable packet switch for switching packets of data from a plurality of input lines to a plurality of output lines according to claim 1, wherein said single stage distribution network is an isomorph of a single electronic crossbar switch which has a plurality of partitions and each partition is a single electronic crossbar switch.

5. The growable packet switch for switching packets of data from a plurality of input lines to a plurality of output lines according to claim 1, wherein said single stage distribution network has a plurality of partitions and each partition has a plurality of electronic crossbar switches, and each partition has at least one path connectable between each input line and each output line.

6. A growable packet switch for switching packets of data from a plurality of input lines to a plurality of output lines according to claim 1, wherein any routing request that arrived during the i-th interval and passes from busy-idle memory (P−1) to busy-idle memory 0 attempts to locate available paths through the remaining partitions during the next interval after the i-th interval.

* * * * *